(12) United States Patent
Ogata

(10) Patent No.: US 7,191,204 B1
(45) Date of Patent: Mar. 13, 2007

(54) COMPUTING SYSTEM USING NEWTON-RAPHSON METHOD

(76) Inventor: Wataru Ogata, 21-14, Kofudai, Yokosuka-shi, Kanagawa, 239-0820 (JP)

( * ) Notice: Subject to any disclaimer, the term of this patent is extended or adjusted under 35 U.S.C. 154(b) by 0 days.

(21) Appl. No.: 10/168,430

(22) PCT Filed: Dec. 22, 1999

(86) PCT No.: PCT/JP99/07241

§ 371 (c)(1),
(2), (4) Date: Oct. 21, 2002

(87) PCT Pub. No.: WO01/46796

PCT Pub. Date: Jun. 28, 2001

(51) Int. Cl.
*G06F 7/52* (2006.01)
*G06F 7/38* (2006.01)

(52) U.S. Cl. ........................ 708/654; 708/605
(58) Field of Classification Search ........ 708/654, 708/605, 500, 504
See application file for complete search history.

(56) References Cited

U.S. PATENT DOCUMENTS 5,280,439 A * 1/1994 Quek et al. .............. 708/628
5,341,321 A * 8/1994 Karp et al. .............. 708/500

FOREIGN PATENT DOCUMENTS

| JP | 64-82229 A | * | 3/1989 |
| JP | 02146621 A | * | 6/1990 |
| JP | 06083587 A | * | 3/1994 |
| JP | 06139053 A | * | 5/1994 |
| WO | WO 9967704 A1 | * | 12/1999 |

OTHER PUBLICATIONS

Ogata et al, "Design Of Reciprocal Calculation Circuit For FPGA", Technical Report of IEICE, VLD98-106, CPSY98-126 (Dec. 1998).*

* cited by examiner

*Primary Examiner*—Tan V. Mai
(74) *Attorney, Agent, or Firm*—Allen, Dyer, Doppelt, Milbrath & Gilchrist, P.A.

(57) ABSTRACT

A dividing circuit and square root extracting circuit using the Newton-Raphson method. The number of places of an initial value of the Newton-Raphson method is decreased, and a part of a multiplier is omitted. Therefore the circuit scale is reduced. A circuit dedicated for the iterated computation circuit for the Newton-Raphson method is mounted, enabling the whole circuits to operate as a pipeline circuit. By cut-off in expanding an iterative operation to a series operation, use of a table, adoption of approximation mode for deriving an initial value, and adoption of redundant expression for computation, higher speed operation and reduction of circuit scale are possible.

26 Claims, 17 Drawing Sheets

COMPUTING SYSTEM USING NEWTON-RAPHSON METHOD

TECHNICAL FIELD

This invention relates to an operational procedure in a computer system. More particularly, this invention relates to a divisional procedure in which a reciprocal number of a given divisor is calculated and this calculated value is multiplied by a dividend to perform a division. Also, the square root extraction's reciprocal is acquired, and it is used in the division or square root extraction calculation that takes place in the operation method.

Unless otherwise particularly restricted in the specification of present patent application, when a floating-point format of simple precision is applied, a procedure for realizing an operation of a reciprocal number or a divisional procedure will be described in reference to, as an example, a data format of floating-point of simple precision in the IEEE-754 standards, i.e. a data format composed of 1 bit of sign part, 8 bits of exponent part and 23 bits of mantissa part (provided that a precision of mantissa part is 24 bits while additionally applying an MSB which is always 1).

This assumption is for purpose of explanation. For the actual mounting of the circuit followed in the operation system described in this invention, according to the necessary calculation accuracy, each parameter may be adjusted.

BACKGROUND OF THE INVENTION

A floating-point division and square root extraction calculation is an operation item in which it requires the longest duration in time in the four arithmetic operations. In order to realize the division, it is roughly classified into a subtraction shift type division, a method for combining tables with operation and a multiplication type division. Even with the square root extraction calculation, the method of combining subtraction, shift, and conditional judgment, and the method of combining table and calculation, the Newton-Raphson method is there.

As the subtraction shift type division, the simplest method consists in a procedure in which a shift instruction, an addition or subtraction instruction (a subtraction instruction or an addition instruction) and a conditional branch instruction are combined to calculate a quotient bit by bit. In addition, a procedure for performing a repetitive processing of shifting, subtraction or addition is also practically mounted and this can perform the processing faster than that of the combination of the aforesaid instructions.

As a procedure for performing a faster division in the subtraction shift type division, there is provided an SRT method. This is a procedure in which an operation for taking a divisor and a dividend from an upper location by several bits and attaining a quotient of several bits on the basis of these bits or an operation for retrieving a table with these bits being applied as index to attain a quotient by several bits is repeated to get a quotient of requisite precision, wherein the number of steps of processing is reduced as compared with that of the procedure for taking a quotient bit by bit as described above. In accordance with a comparison between a subtraction shift type division unit and a multiplication type division unit practically mounted in an LSI, it is advantageous to apply an SRT method having a high radix.

It is also proposed to provide a procedure for combining a table and an operation in order to perform a division. This is a procedure in which the table is stored in ROM, a part of bit-string expressing a mantissa part of divisor is extracted as a bit field, calculation is performed on the basis of a value attained from the table with its content being applied as an index to get a reciprocal, this reciprocal is multiplied by a dividend to realize a division.

As the multiplication type division, there is provided a Newton-Raphson method (hereinafter called as an N/R method). This is a procedure in which an approximate value of reciprocal of given divisor is attained, an iteration calculation indicated by $$Y_{n+1} = Y_n \cdot (2 - Y_n \cdot R_m)$$

[$R_m$ is a mantissa part of divisor]

is carried out to attain a reciprocal of predetermined precision, this value is multiplied by a dividend to realize a division.

Pertaining to the square root extraction calculation, the approximate value, $Y'_0$, of the reciprocal's, $Y'\infty$, given square root extraction argument, $R'_m$, is acquired in a similar fashion.

$$Y'_{n+1} = \frac{1}{2} Y'_n \cdot (3 - Y'^2_n \cdot R'_m)$$

[R'm is the divisor's mantissa] This shows how the repetitive calculation occurs, and how the fixed accuracy of the square root extraction's reciprocal is produced. This is a method to multiply the product in the argument to realize the square root extraction.

In the case of the subtraction shift type procedure, it is necessary to judge a condition every time one step is processed, so that there remains a problem that an operation requires much time to realize the division under a combination of a shift instruction, an addition and subtraction instruction and a conditional branch instruction by a programming. In addition, since there is a data dependency between the instructions, there is also a problem that it is difficult to improve a processing speed even if a computer having an architecture with an instruction pipe-line configuration is used.

In the case of that a subtraction shift type division is executed by repeating a shifting or an adding or a subtraction through a micro-programming, it can be processed at a higher speed as compared with that of the procedure in which each of the aforesaid instructions is combined to each other. However, this subtraction shift type division shows a problem that it requires an excessive amount of processing time as compared with that of the case in which a single adding instruction, a subtraction instruction and a multiplication instruction (hereinafter these instructions are called in total as an adding-subtraction-multiplication instruction) are applied.

In the case of the SRT method having a high radix, although it shows a high speed operation as compared with the aforesaid simple subtraction shift type division, there still remains a problem that it requires much number of steps. In addition, in order to perform a practical mounting of the SRT method having a high radix, it is necessary to constitute a circuit for performing a subtraction by subtracting a subtractor through a multiplication unit or to constitute a selector for selecting a subtractor to perform a subtraction in response to a temporary resolution attained by a pre-calculated subtractor corresponding to a possible temporary resolution, this method is not necessarily advantageous in view of a time duration required for operation as well as a resource to be used.

In addition, in the case of the subtraction shift type division, since the circuit resource is repeatedly used while one division is being carried out, there remains a problem that the operation circuit is occupied, a subsequent division can not be started and its throughput can not be improved.

The procedure for combining a table with an operation also has a problem that it shows a poor efficiency in actual mounting when it is practically mounted on an LSI due to the fact that even a small-sized unit may require a memory of capacity of several tens to hundreds kilo-bits for performing an operation of simple precision.

In the case of the N/R method, there has been practically mounted a circuit in the prior art that a table of initial values is stored in a memory, a requisite bit field is extracted from the MSB side in the bit-string expressing a mantissa part of the given divisor, the initial value is taken out as an index and applied to an iteration calculation.

In the case of the existing practical mounting, there have been provided many cases using a table of precision of about 8 bits or the like, although, this procedure shows a problem that it is necessary to perform the iteration calculation two times for attaining a reciprocal of simple accuracy and it takes much time when an iteration calculation is performed under a combination of addition, subtraction and multiplication instructions.

In order to attain a precision of 24 bits through one time iteration, it is necessary to provide a precision of minimum 12 bits as an initial value and in the case that this is made directly as a table, it is minimum required to provide a memory having a capacity of 12 bits with a width of 4096 words, i.e. 49,152 bits (6 kilo-bytes).

Actually, it is also necessary to arrange a guard bit for performing an operation and it is required to provide a capacity of several times of it, so that it shows a problem that it occupies a large area to constitute it on the LSI and so its efficiency is poor. In addition, it shows a problem that it can not be mounted in a programmable logic device presently available in the market (hereinafter called as PLD, wherein the PLD herein defined includes some programmable devices such as a CPLD, i.e. Complex Programmable Logic Device or FPGA. i.e. Field Programmable Gate Array or the like).

In addition, in the case that an initial value having a precision of 12 bits is attained and one time iteration calculation is carried out, a recurrence formula expressed by $$Y_{n+1} = Y_n \cdot (2 - Y_n \cdot R_m)$$

[$R_m$ is a mantissa part of a divisor]
, more practically, an operation expressed by $$Y_1 = Y_0 \cdot (2 - Y_0 \cdot R_m)$$

is performed. However, in the case that this operation is realized under a combination of separate operation codes, there occurs a problem that a data dependency is produced between a plurality of instructions, an efficient processing can not be carried out in a processor having an instruction pipe line or an operation pipe line, a conflict using the operation device is produced, it occupies the operation device and so other instructions can not be executed.

There has been provided an operation device having two modes, i.e. one mode in which the conventional operation of 24 bits×24 bits is performed after modifying an existing multiplication unit and the other mode in which a product of an initial value $Y_0$ and a mantissa $R_m$ of a divisor is subtracted from 2.0 while this product is being calculated. The latter mode is performed such that the upper level bit is operated with a complementary number of 2 of the product being applied, so that it can be realized without scarcely adding a circuit. However, also in this case, there remains a problem that the iteration calculation can not be carried out together with other operations and its performance is deteriorated. Further, since the same multiplication unit is used repeatedly for repetition of the N/R method, a subsequent division can not be started until one division operation is completed and its throughput can not be improved.

Additionally, in the case that a reciprocal of high precision (for example, 48 bits of twice of a simple precision are applied herein) is calculated by the N/R method, it is necessary to apply a reciprocal of precision of 24 bits as an initial value to perform one time iteration calculation or to apply a reciprocal of precision of 12 bits to perform iteration calculation twice, and the former case has a problem that a size of the required table becomes large. In turn, in the case of the latter one, there remains a problem that a size of circuit for performing an iteration calculation of second time becomes large and its operation time is extended.

In addition to this problem, there remains a further problem that a large-sized table can not be mounted in the PLD having a high restriction in a circuit resource and a calculation of reciprocal or a division performed by the N/R method can not be practically mounted.

In the case of the mounting of a square root extraction calculation, the same problems exist.

DISCLOSURE OF THE INVENTION

The present invention has been invented to solve the aforesaid various problems and as its object it provides a division circuit using a small-sized low zero point and high throughput reciprocal calculation circuit.

More practically, at first, there is provided means for making a small-sized table applied for attaining an initial value of the N/R method. That is, there is provided a calculation means in which a small-sized table can be sufficiently applied not by storing the initial value itself in the table but by inputting the value retrieved from the small-sized table into the operation unit to calculate an initial value. Further, there is provided means for determining a minimum size of the table to be required or the contents of the table.

Next, in the case that a reciprocal and a square root extraction's reciprocal of required precision are calculated after performing an iteration calculation with the N/R method in reference to the attained initial value, an exclusive circuit for performing an iteration calculation is constituted in order to avoid an increasing in calculation time caused by a calculation under a combination of operation codes by a programming and then a circuit capable of improving a throughput by arranging the pipe line format. Further, there is provided a configuration of an operation circuit to save a circuit resource required in its exclusive circuit, reduce a circuit size and shorten a calculation time.

In addition, there is provided a configuration of the operation circuit in which an approximate value of a reciprocal and a square root extraction's reciprocal of high precision are not required in order to calculate a reciprocal of high precision through the N/R method, the time of iteration is not increased and a precision of the reciprocal and square root extraction's reciprocal attained through calculation.

Further, there is provided a method for efficiently mounting either a reciprocal and a square root extraction's reciprocal calculation circuit using the N/R method or a division circuit using the N/R method on the PLD.

In the following description, a mantissa part $R_m$ 100 of a divisor R expressed by the floating-point format (in the present specification, it is assumed that it is normalized in a range of $0.5 \leq R_m < 1.0$ and this is called as a mantissa part 100 of the divisor) is noted. In the case that it is merely expressed as a divisor, it is meant by a mantissa part 100 ($R_m$) of a given divisor R unless otherwise specially defined in the specification.

Also, attention is paid to the square root extraction calculation or the square root extraction's reciprocal calculation in the expression of the floating point form's argument, R', and its mantissa, R'm400 (hereafter, the argument's mantissa will be called 400). This especially points to the limited and the given argument's, R', mantissa, 400(R'm).

In this explanation, the range of formalization is $0.5 \leq R_m$, $R'_m < 1.0$.

In the present invention, the division is realized in such a way that a reciprocal is calculated by the N/R method, this is multiplied by a dividend by a separate multiplication instruction to attain a quotient. Or, a circuit for multiplying a reciprocal attained by the N/R method to a dividend is added to realize the division.

Also, for the square root extraction calculation, the square root extraction's reciprocal of the argument is acquired through the N/R method. Through a command for separate multiplication, this is multiplied in the argument to produce the square root extraction. In other words, through the N/R method, the square root extraction's reciprocal of the argument is produced and entered into the circuit to realize the square root extraction calculation.

In the case of the invention described in claim 1, a bit string expressing the mantissa part 100 of given divisor is divided into a plurality of bit fields, the values are retrieved from the table stored in the memory with the contents being applied as index, the value and the content of the bit fields are applied to perform a calculating operation and to attain an initial value 104. In FIG. 2 is illustrated its technical concept.

That structure is outlined in FIG. 5. A divisor's mantissa part 100 and a dividend's mantissa part 501 are given and comprised of an initial value calculation circuit 504, a multiplication unit 503 with a correction unit, and a multiplication unit 502. In this case, it is preferable that a reciprocal number of 106 is taken out and multiplied by a mantissa 501 of the dividend with a separate multiplication command. Then there is a multiplication unit 506 for multiplying it by the mantissa part 501 of the dividend to calculate a mantissa part 507 of a quotient.

The initial value calculation circuit 504 may calculate an approximate value of a reciprocal number of a given dividend, i.e. an initial value 104 of the N/R method in reference to the mantissa part 100 of the given dividend. In the prior art method, a bit field was extracted from the bit-string expressing the mantissa part 100 of the dividend and the initial value was retrieved from the table with the content being applied as an index.

It is also applicable that as the initial value calculation circuit 504, a circuit for performing an iteration of the N/R method on the basis of a more rough approximate value of a reciprocal number of the mantissa part 100 of the divisor to calculate a reciprocal number having a required precision is employed and its output may be used as the initial value 104. Or, it is also applicable that another convenient reciprocal number calculating circuit is used.

The multiplication unit 503 having a corrector unit (having a circuit or a function not merely outputting a product, but applying modification to the attained product) performs a calculation to subtract a product of the initial value 104 and the mantissa part 100 of the divisor from 2.0 to output a value 505. However, since it is satisfactory to take a complementary number of 2 of the product and operate the location of 2.0, the number of used elements and the calculating time are scarcely changed from those for a simple multiplication circuit.

In the case of the present invention described in claim 2, when the value 106 is to be attained, $$Y_1 = Y_0 \cdot (2 - Y_0 \cdot R_m)$$

changed into $$Y_1 = Y_0 + \Delta Y$$

is modified to be divided into $$Y_0$$

and $$\Delta Y = Y_0 \cdot (1 - Y_0 \cdot R_m) = Y_0 \cdot \beta$$

to calculate once a difference $\Delta Y$ and finally a reciprocal number 106 is attained.

More practically, a value 111 in which a product of the initial value 104 and the mantissa part 100 of the divisor is subtracted from 1.0 indicated in $$\beta = (1 - Y_0 \cdot R_m)$$

is defined as $\beta$, this value is multiplied by the initial value 104 to make a difference 109, and further the initial value 104 is added to it to attain the reciprocal number 106.

This invention can be applied to a square root extraction's reciprocal calculation.

In FIG. 6 is shown an example of the configuration of the operation circuit in accordance with claim 2. This is an example in which the product of the initial value 104 and the mantissa part 100 of the divisor is subtracted from 1.0 to attain the value 111. Modification of the equation causes a part of partial product at the multiplication unit 601 having a corrector to be eliminated and also at the multiplication unit 603, a part of the partial product is eliminated.

The multiplication unit 601 having a corrector performs a calculation indicated in $$\beta = (1 - Y_0 \cdot R_m)$$

and performs a calculation to subtract the product of the initial value 104 and the mantissa part 100 of the divisor from 1.0. However, it is satisfactory that a complementary number of 2 of the product is taken and the level of 1.0 is operated. In addition, an absolute value of the value 111 of the result of calculation is lower than an absolute value of the value 505.

There is provided a configuration in which the initial value 104 is added through a path 602 under an application of an adder 604 to a product 109 attained by multiplying the initial value 104 to the value 111 of the result attained by the multiplication unit 601 having a corrector and then the value 106 is calculated. It is also applicable that this adder is employed as a part of an adder of the multiplication unit 603 and a block 605 is constituted as one operation unit. This fact can be similarly applied to the blocks 707, 805, 904 and 1004.

Pertaining to this invention's claim 3, when the square root extraction's reciprocal is provided by the N/R method, the repetitive calculation is mounted in the calculation circuit. The initial value 400 and the calculation's guard bit are rounded to the minimum necessary accuracy, while the subordinate bit becomes 0. Therefore, the N/R method's repetitive calculation circuit is simplified.

That structure is outlined in FIG. 4. An argument's mantissa 400 is given and comprised of an initial value calculation circuit 401, a multiplication unit 405 with a correction unit, and a multiplication unit 407. In this case, it is preferable that a square root extraction's reciprocal number 411 is taken out and multiplied by a the argument 400 with a separate multiplication command. Then there is a multiplication unit 412 for multiplying it by the argument's mantissa 400 to calculate the square root extraction 413.

That structure is outlined in FIG. 5. A divisor's mantissa part 100 and a dividend's mantissa part 501 are given and comprised of an initial value calculation circuit 504, a multiplication unit 503 with a correction unit, and a multiplication unit 502. In this case, it is preferable that a reciprocal number of 106 is taken out and multiplied by a mantissa 501 of the dividend with a separate multiplication command. Then there is a multiplication unit 506 for multiplying it by the mantissa part 501 of the dividend to calculate a mantissa part 507 of a quotient.

Pertaining to this invention's claim 4, claims 1 and 3 fall into a range where the initial value's subordinate bit may be omitted.

Pertaining to this invention's claim 5, claims 1 and 3 relate to the initial value's subordinate bit and the specific omission method. This shows a case of a method for rounding up.

Pertaining to this invention's claim 6, claims 1 and 3 relate to the initial value's subordinate bit and the specific omission method. This shows a case of a method for rounding down.

Pertaining to this invention's claim 7, claims 1 and 3 relate to the initial value's subordinate bit and the specific omission method, where 0 is replaced by 1. That is, this shows a case where if the place of concern is 0, then it rounded down, and if is 1, it is rounded up.

Pertaining to this invention's claim 8, claim 2 shows that in the invention, the difference is separated and calculated, and a more detailed, specific method for a possible omission of the bit position.

Pertaining to this invention's claim 9, claims 2 and 8 show the application of a method for the square root extraction's reciprocal calculation.

Pertaining to this invention's claim 10, the operation method that shares parts of the reciprocal calculation and square root extraction's reciprocal calculation is described. The mounting based on this operation method is exemplified in FIG. 18. Selectors 1801, 1803, and 1809 exist, and for the reciprocal calculation on the (D) side, and the square root extraction's reciprocal calculation on the (R) side, the input is led to the output. Also, as for the multiplication unit 1805 with the correction unit, when there is a square root extraction's reciprocal calculation, the upper level is done, and when there is a reciprocal calculation, the lower level is done.

In the case of the present invention described in claim 11, a value 111 in which a product of the initial value 104 and the mantissa part 100 of the divisor is subtracted from 1.0 indicated in $$\beta = (1 - Y_0 \cdot R_m)$$

is defined as β, this value is applied to improve a precision of calculation of a reciprocal number.

Since a value 150 when a recurrence formula of the N/R method $$Y_{n+1} = Y_n \cdot (2 - Y_n \cdot R_m)$$

is repeated by times of (n) is expressed in the form of $$Y_n = Y_0 \cdot \sum_{i=0}^{2n-1} \beta^i$$

under application of only the initial value 104 and the value 111, a circuit for calculating this value is practically mounted.

In addition, the value 151 in the case that the iteration is repeated by a limitless number of times to improve its precision in a limitless manner is expressed by $$Y_\infty = Y_0 \cdot \sum_{i=0}^{\infty} \beta^i$$

under application of the initial value 104 and the value 111. In addition, a value Y∞ when a calculation of series is finished at the n-th term is expressed by $$Y_x = Y_0 \cdot \sum_{i=0}^{n} \beta^i$$

An error at this time passes through $$Y_\infty = Y_x + \delta_y$$

and is based on a value by indicated by $$\delta_y = Y_0 \cdot \sum_{i=n+1}^{\infty} \beta^i$$

In the case of the present invention described in claim 12, a circuit to perform a calculation of $$Y_x = Y_0 \cdot \sum_{i=0}^{n} \beta^i$$

for performing a calculation of series by definite number of times is practically mounted. In FIG. 7 is illustrated its schematic configuration. In FIG. 7. the value 111 is multiplied in sequence to attain a value of n-th power, although it is preferable that a value of the n-th power is calculated from the value 111 under application of the circuit for performing factorial calculation such as a square and a cube or the like. This is similarly applied to FIG. 8 or FIG. 10.

In the case of the present invention described in claim 13, a value of the calculation of series is applied as a table and stored in a memory, a bit field having a proper bit width is extracted from the MSB side of the bit-string expressing the value 111, the value is retrieved from the table with the bit field being applied as an index and this is used as a part of the calculation of the series. An operation for retrieving this table is similar to the case of the present inventions described in claims 14 to 16.

As a value of the table stored in the memory, a value of total of the limitless number of terms having a higher degree than that of a certain n-th term may be used or a total value finished at the definite number of terms may be used under a condition in which a requisite precision can be attained.

In the case of the present invention described in claim 13, in FIG. 8 is illustrated a calculation circuit as an example in which the terms up to the third or cubic degree are separately calculated, a value 801 having a total number of terms of higher degree subsequent to fourth degree is applied as a table and stored in a memory.

In the case of the present invention described in claim 14, there is practically mounted a circuit in which the values of $$\sum_{i=2}^{\infty} \beta^i$$

are stored in a memory 905 as a table, a bit field is extracted from the MSB side of the bit-string expressing the value 111, the value is retrieved from the table with its content being applied as an index to perform a calculation of $$Y_\infty = Y_0 \cdot \left(1 + \beta + \sum_{i=2}^{\infty} \beta^i\right)$$

In FIG. 9 is shown its configuration.

In the case of the present invention described in claim 15, there is practically mounted a circuit in which the values in a term 155

$$\sum_{i=3}^{\infty} \beta^i$$

in $$Y_\infty = Y_0 \cdot \left(1 + \beta + \beta^2 + \sum_{i=3}^{\infty} \beta^i\right)$$

are applied in a table and stored in a memory 1005, a value of the term is retrieved from the table with the content of the bit field extracted from the bit-string expressing the value 111 to calculate $$Y_\infty = Y_0 \cdot \left(1 + \beta + \beta^2 + \sum_{i=3}^{\infty} \beta^i\right)$$

In FIG. 10 is illustrated its configuration.

In the case of the present invention described in claim 16, there is practically mounted a circuit in which the values in a term 156 in $$\sum_{i=4}^{\infty} \beta^i$$

$$Y_\infty = Y_0 \cdot \left(1 + \beta + \beta^2 + \beta^3 + \sum_{i=4}^{\infty} \beta^i\right)$$

are applied in a table and stored in a memory 801, a value in the term is retrieved from the table with the value 111 being applied as an index. FIG. 8 corresponds to its configuration.

In the case of the present invention described in claim 17, there is practically mounted a circuit to perform a calculation of $$Y = Y_0 \cdot (1 + \beta + \beta^2)$$

Its configuration corresponds to a form in which the multiplication unit 702 and the multiplication unit 703 are removed from FIG. 7.

In the case of the present invention described in claim 18, there is practically mounted a circuit to perform a calculation of $$Y = Y_0 \cdot (1 + \beta + \beta^2 + \beta^3)$$

Its configuration corresponds to a form in which the multiplication unit 703 are removed from FIG. 7.

Pertaining to this invention's claim 19, the square root extraction's reciprocal calculation, the argument 400, the initial value 401, $$\beta' = \frac{1}{2}(1 - Y_0'^2 \cdot R_m')$$

depending on the above, the value of β' (value 402) is produced and used in the following higher function, $$Y_\infty' = Y_0' \cdot \left(1 + \beta' + \beta'^2 + \sum_{i=3}^{\infty} N_i \cdot \beta'^i\right)$$

and the square root extraction's reciprocal of high accuracy is produced. FIG. 19 is an example.

FIG. 19 is an example of four items calculated.

Pertaining to this invention's claim 20, for the square root extraction's reciprocal calculation, $$Y_2 = Y_0' \cdot (1 + \beta' + \beta'^2 + 1.5\beta'^3 + 2.5\beta'^4 + \beta'^5)$$

is calculated using the argument 400, the initial value 401, and the value of 402. This shows how the operation takes place. With two rounds of the repetitive calculation, an equal accuracy can be gained with the square root extraction's reciprocal as with the initial value 402. It is possible to lower the degree of the proper series according to the necessary calculation accuracy.

FIG. 19 shows a calculation circuit with five items omitted.

Pertaining to this invention's claim 21, in the square root extraction's reciprocal calculation, a part of the series is put in a table, stored in memory 2001, and the value 402 that is expressed in the bit field is extracted from the bit array's MSB side. The contents are indexed, and the values are taken from the table and calculated. FIG. 20 shows an example of the mounting.

Pertaining to this invention's claim 22, depending on the series calculation, the operation circuit's mounting is more compact. This is from the shared presence of the multiplication circuit 1805 with a correction unit, multiplication circuits 2101, 2102, 2103, 2106, etc., reciprocal calculation circuit, and square root extraction's reciprocal calculation circuit.

FIG. 22 shows the an example of the structure. Depending on selectors 1809, 1801, 1803, 2109, 2110 and the multiplication circuit 1805 with a correction unit, the reciprocal calculation and square root extraction's reciprocal calculation switches.

In the case of the present invention described in claim 23, when an error 1721 allowed for an approximate value of a reciprocal number is given, it may provide an equation indicating a minimum value in the table applied for a primary approximation.

In the case of the present invention described in claim 24, when the circuit for performing a calculation of reciprocal number is mounted on the PLD, an LUT is used as a memory and then the table used in the initial value calculation circuit is stored in it. It is also applicable that a plurality of LUTs are connected to constitute a larger ROM memory and the tables are stored in the memory. In FIG. 11 is illustrated its example. 1103 is a memory in which LUT is applied as a memory cell, and 1104 is an LUT in which a plurality of LUTs are connected to act as one for constituting a large capacity memory.

In the case of the present invention described in claim 25, when the circuit for performing a calculation of series is mounted on a PLD, LUTs are used as a ROM memory and then a table of values of a part of the series calculation is stored in the memory. It is also applicable that a plurality of LUTs are connected to act as one for constituting a large capacity ROM memory and the table is stored in the memory.

In the case of the present invention described in claim 26, a calculation time is shortened under application of a calculation procedure for redundancy expression at a part where a multiplication is continuously performed or at a part where addition or subtraction and multiplication are alternatively continued when a calculation of initial value, an iteration calculation and a calculation using a value in which a product of the initial value and the divisor is subtracted from 1.0 are carried out.

Figure 1:
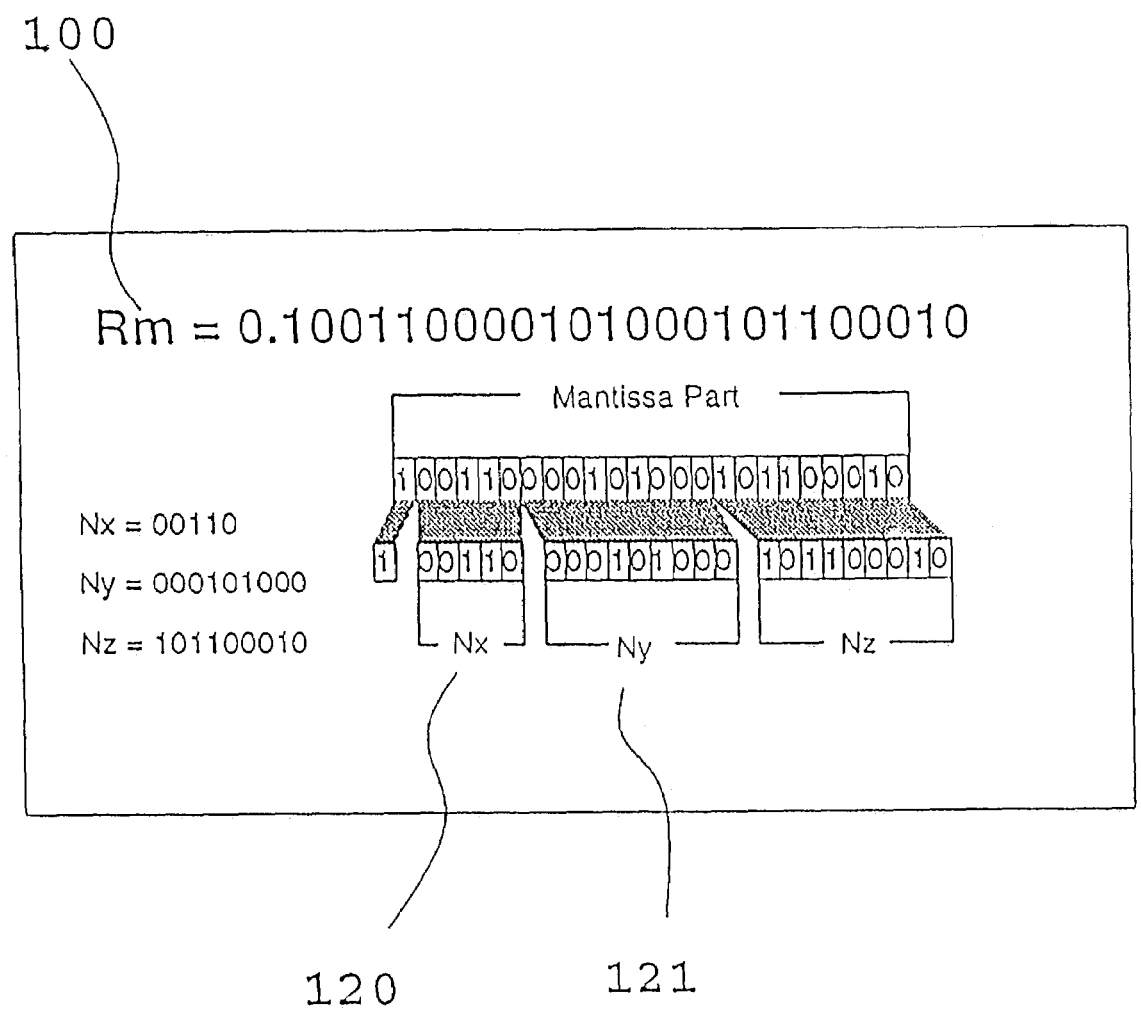
FIG. 1 is an illustrative view for showing a state in which a bit-string constituting a mantissa part of a divisor divided into three bit fields.
Figure 2:
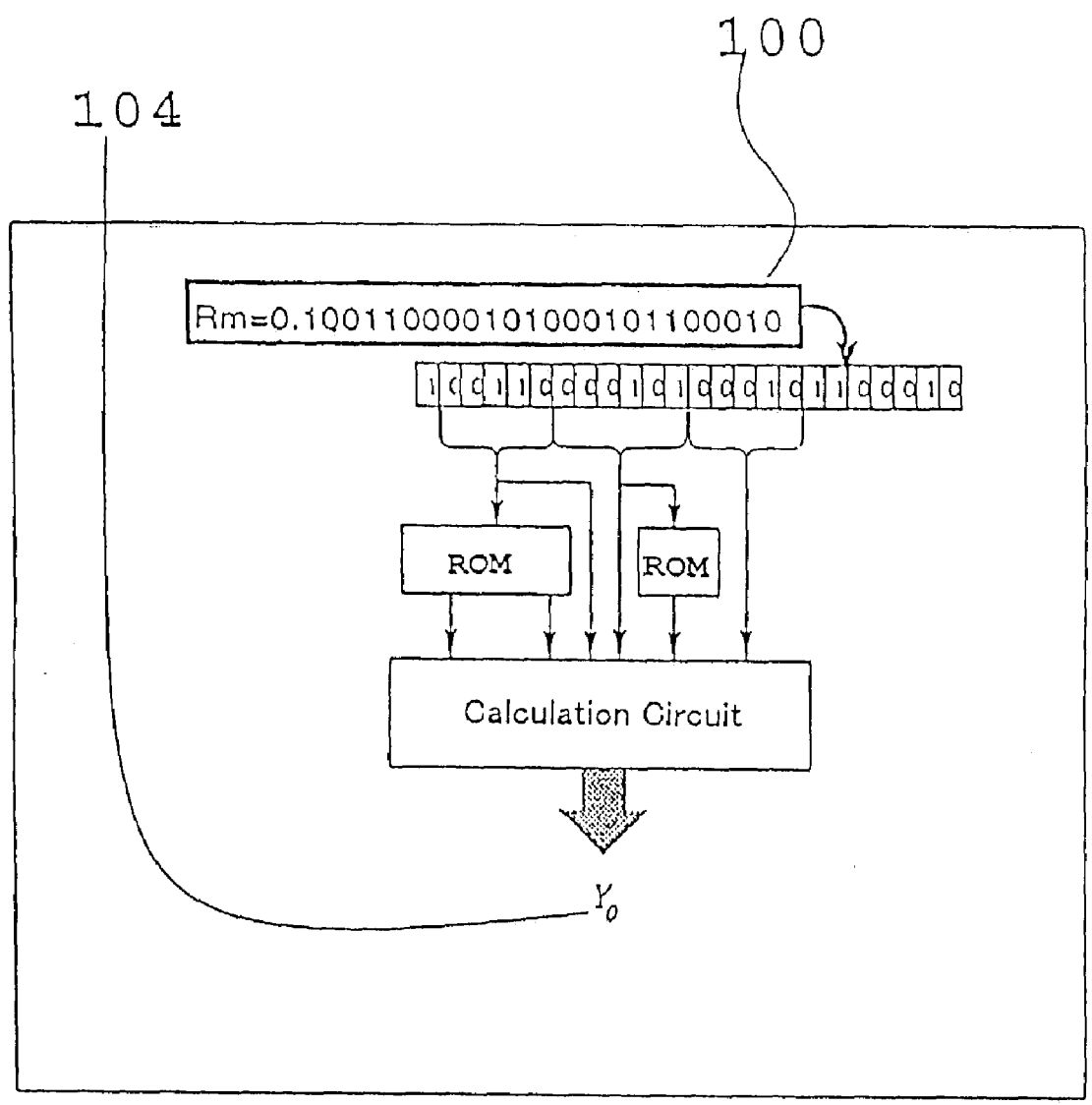
FIG. 2 is an illustrative view for showing a state in which an initial value in one preferred embodiment of the present invention is attained.

EXPLANATION OF SIGNS 100 divisor's mantissa
104 initial value
106 reciprocal
120,121 bit fields
301,302 memory
303 multiplication circuit
304 subtraction circuit
501 dividend's mantissa
502,506,603,701,702,703,705,803,903,1003 multiplication unit
503,601 multiplication unit correction unit
504 initial value calculation circuit
507 mantissa of a quotient
604,704,706,802,804,902,904,1002,1004 addition unit
801,901,1001 memory

PREFERRED EMBODIMENTS OF THE INVENTION

Preferred embodiment in which the invention described in claim 1 is applied to a calculation of a single precision will be described as follows. When the mantissa part 100 ($R_m$) of the divisor expressed by a bit-string shown in FIG. 1 is given, one bit of MSB is placed from this upper level, 5 bits are taken and a bit field 120 ($N_x$) is set. Subsequently, 9 bits are taken and a bit field 121 ($N_y$) is set. Then, a definition region $0.5 \leq R_m < 1.0$ of the divisor 100 is divided into 32 sections, and an initial value in each of the sections is attained in a precision of 12 bits.

Figure 12:
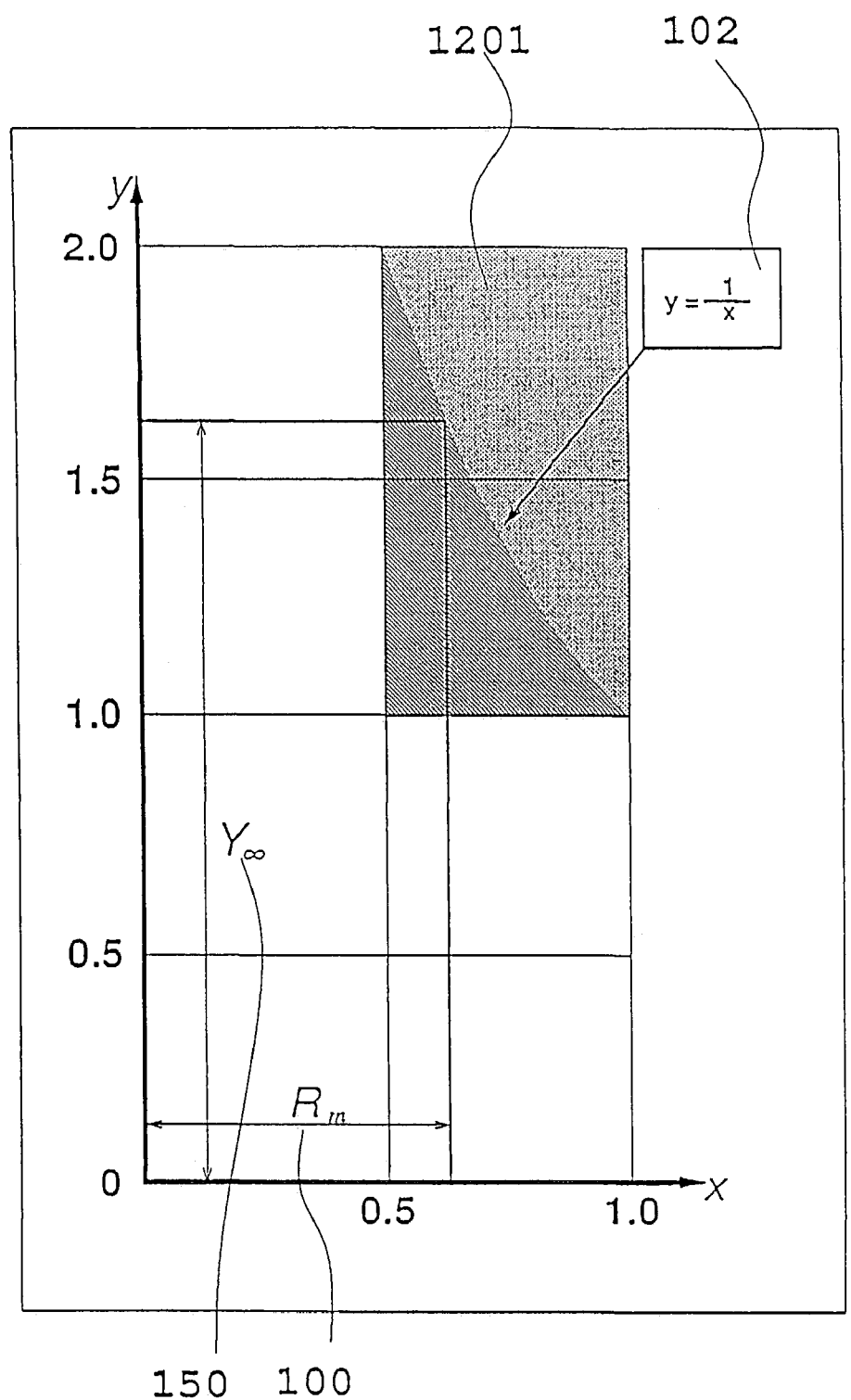
FIG. 12 shows a part of a curved line $y=1/x$.
Figure 13:
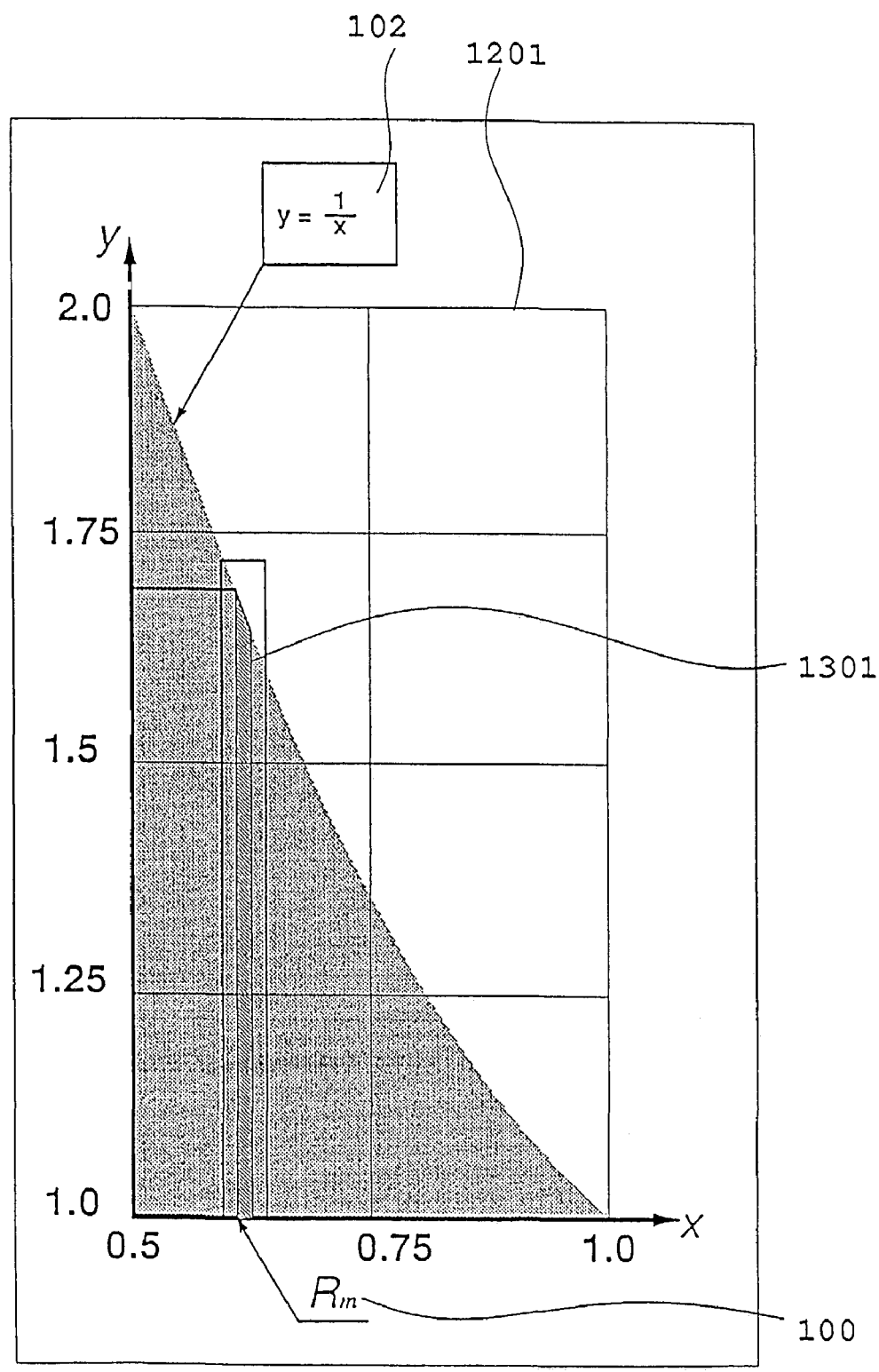
FIG. 13 is a partial enlarged view of a curved line in FIG. 12.

FIG. 12 is a part of a curved line expressed by $$y = \frac{1}{x}$$

and in FIG. 13 are shown in an enlarged scale a definition region $0.5 \leq R_m < 1.0$ of the mantissa part 100 of the divisor and a part where a value region of its reciprocal number of $Y = 1/R_m$ (where, $1.0 \leq 1/R_m \leq 2.0$) is set (a colored part 1201).

Figure 14:
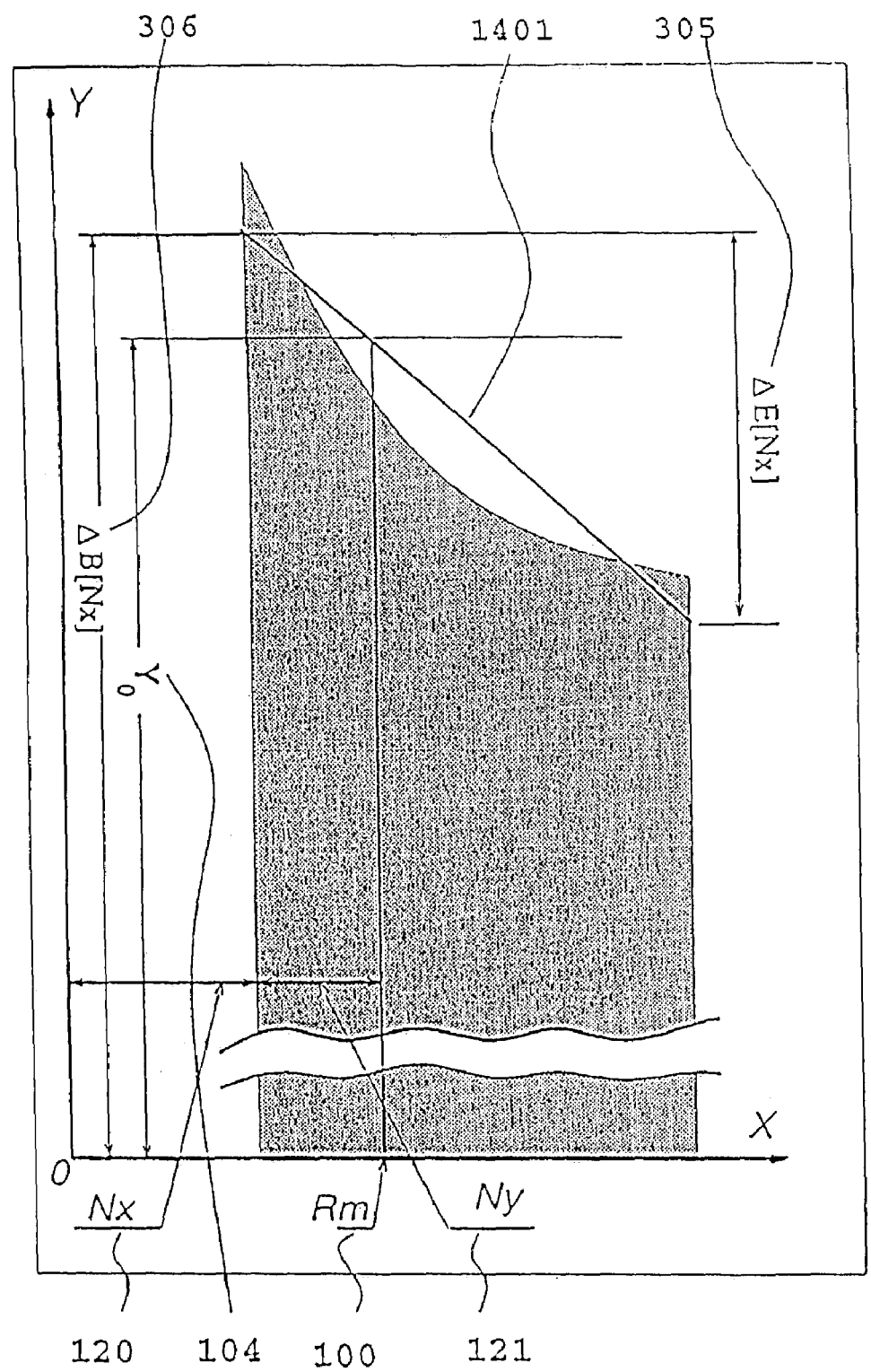
FIG. 14 is a partial enlarged view of a curved line in FIG. 13.

In FIG. 13, the definition region is divided into 32 sections, the value of the bit field 120 ($N_x$) is used and a section near the given divisor is set. A column-like portion indicated by a dark color part 1301 is a selected section and a primary approximation is carried out in it. In FIG. 14 is illustrated one in which this part is enlarged.

Figure 3:
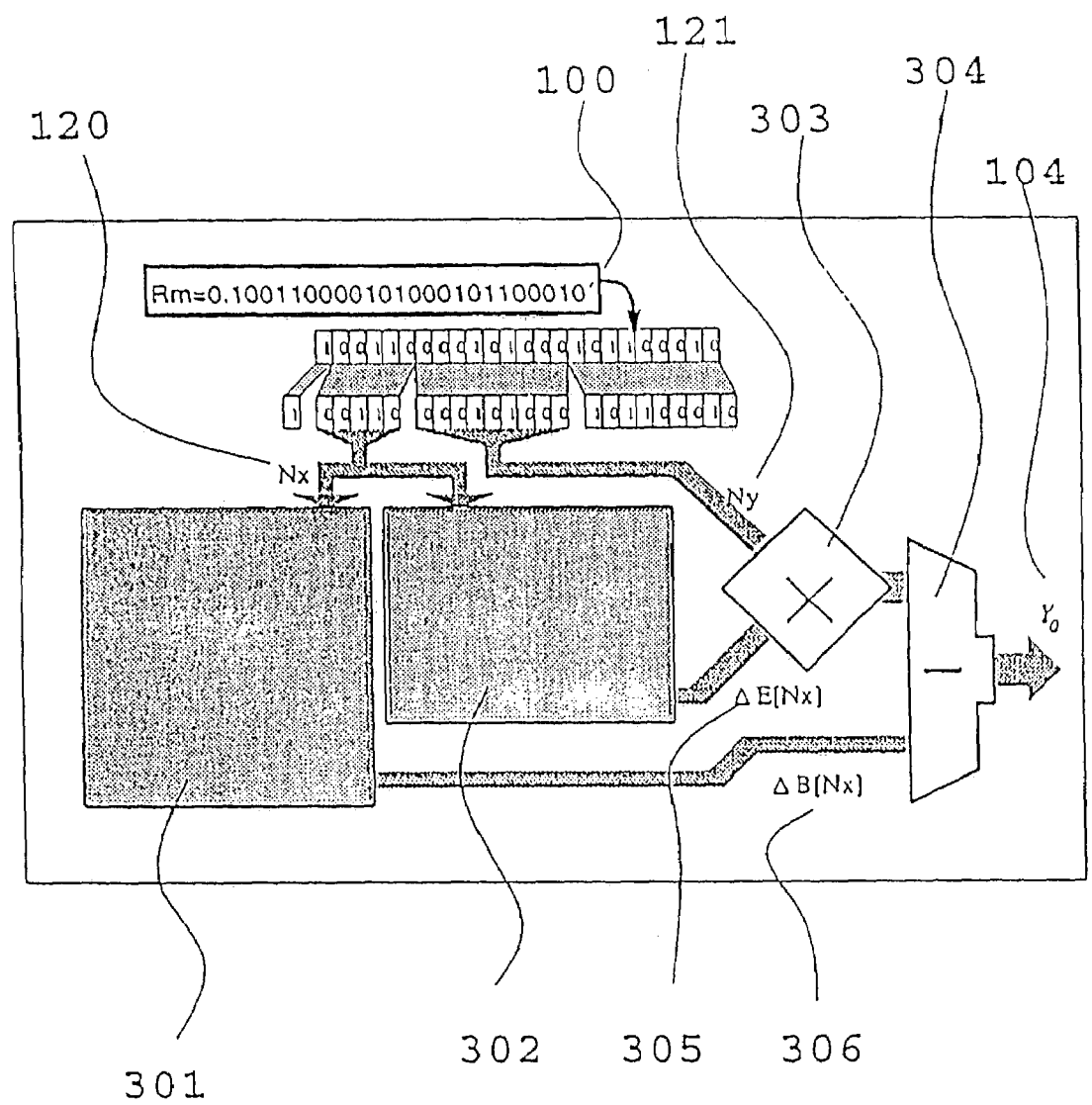
FIG. 3 is a circuit configuration view for attaining an initial value in one preferred embodiment of the present invention.
Figure 4A:
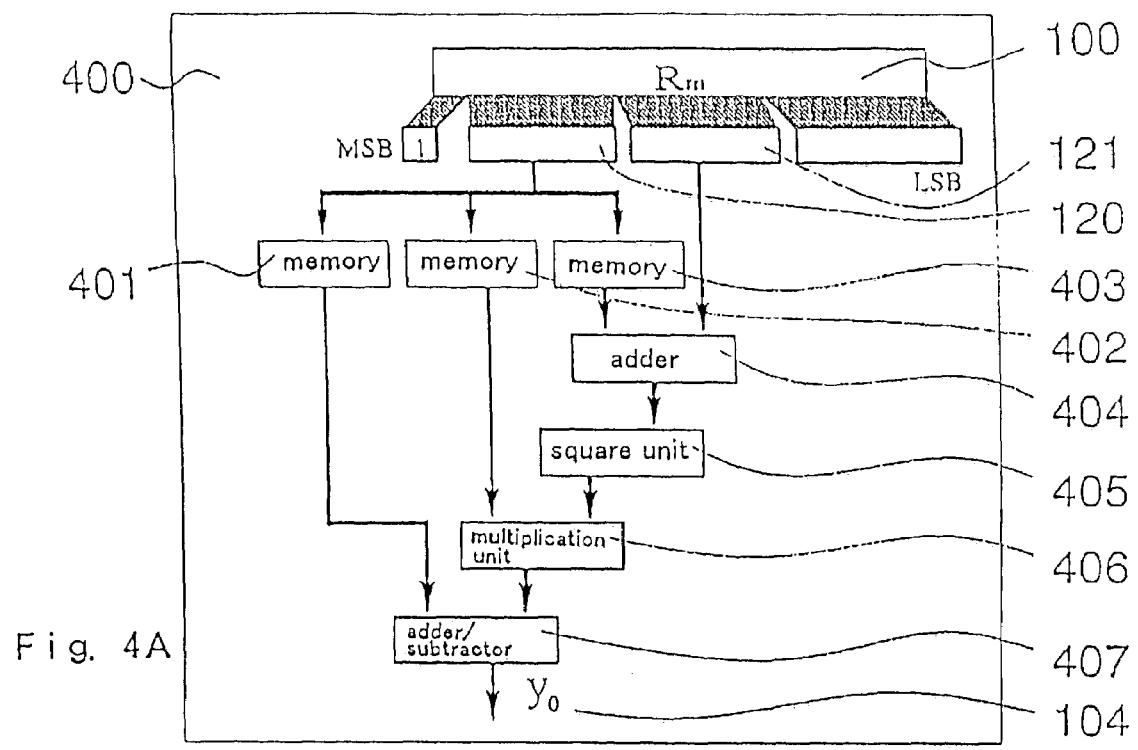
FIG. 4 is a circuit configuration view for attaining an initial value in one preferred embodiment of the present invention.
Figure 4B:
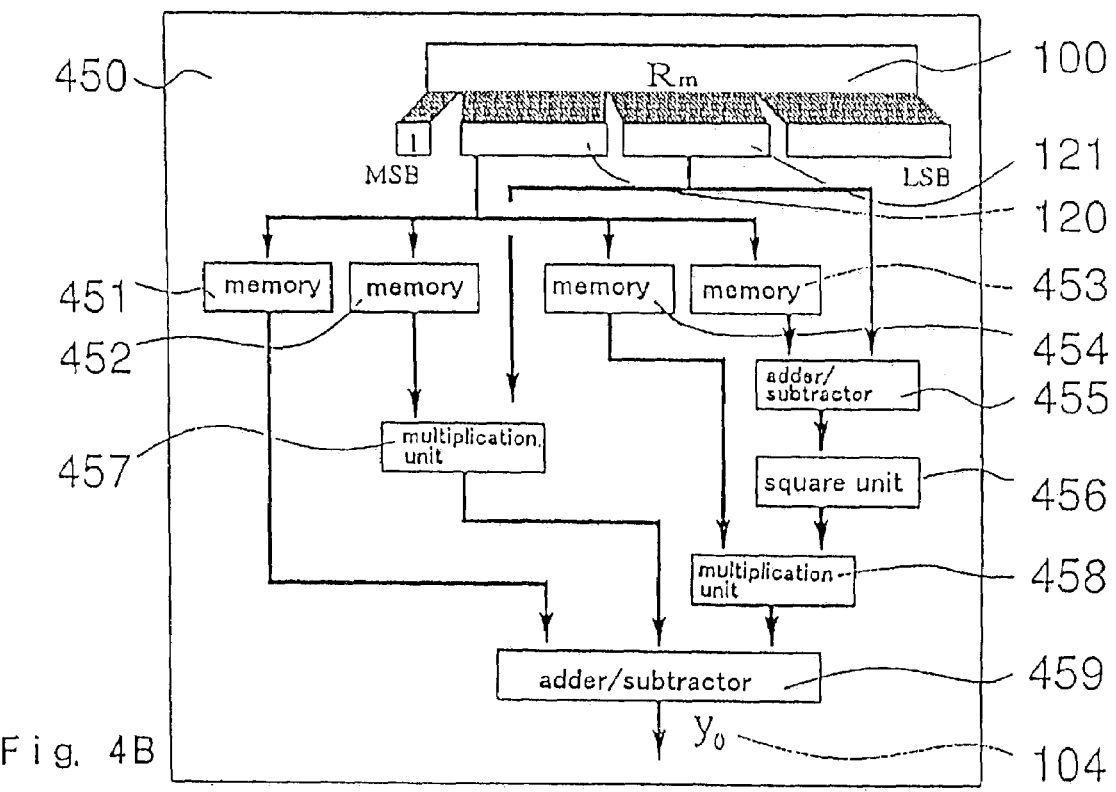
Figure 5:
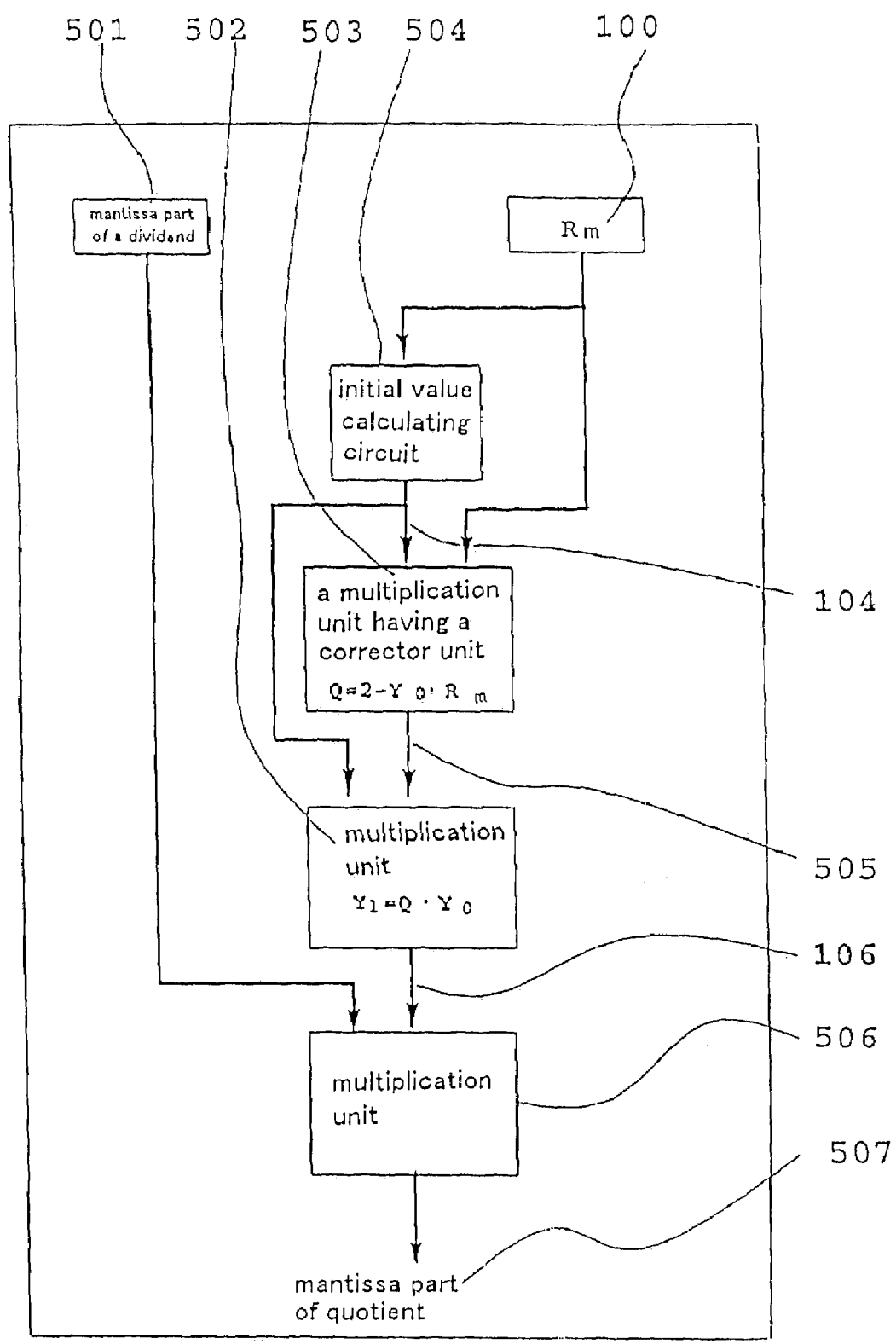
FIG. 5 is a circuit configuration view in which an iteration calculation itself of the N/R method in one preferred embodiment of the present invention.

In FIG. 3 is shown a circuit configuration in which a primary approximation calculation is performed. Values required in a primary approximation in each of the sections are an approximate value 306 of a reciprocal number in each of the sections and a value 305 of inclination of a line used in a primary approximation in the section and a memory 301 of 14 bits and 32 words is applied to the former and a memory 302 of 9 bits and 32 words is applied to the latter. It is satisfactory that a memory of total capacity of 736 bits is prepared.

The circuit is comprised of a memory of 14 bits and 32 words; a memory 302 of 9 bits and 32 words; a multiplication unit 303; and a subtractor 304. A value 305 of gradient retrieved from the memory 302 and a bit field 121 are multiplied by the multiplication unit 303, the product is subtracted from an approximate value 306 retrieved from the memory 301 under application of the subtractor 304 to calculate an initial value 104.

An approximate value 306 of $Y = 1/R_m$ in the selected region is retrieved from a minor capacity memory 301 with the field 120 being applied as an index. In concurrent with this operation, a value 305 of gradient in a line 1401 in this section is retrieved from a minor capacity memory 302. Subsequently, a value of the field 121 is multiplied by the gradient 305 and subtracted from an approximate value 306 and then the initial value 104 is attained through $$Y_0 = \Delta B[N_x] - \Delta E[N_x] \cdot N_y$$

This value has a precision more than 12 bits as a reciprocal number of the mantissa part 100 of the divisor.

In addition to this procedure, it is also preferable to apply another procedure in which each of the approximate values at a left end and a right end of the line 1401 of the primary approximation in the section is stored in the two memories and a circuit for taking an intermediate point by the bit field 121 is applied to calculate an approximate value.

In order to attain a reciprocal number 106 having a precision of 24 bits in reference to the initial value 104 provided in this way, it is satisfactory to calculate $$Y_1 = Y_0 \cdot (2 - Y_0 \cdot R_m)$$

Figure 15:
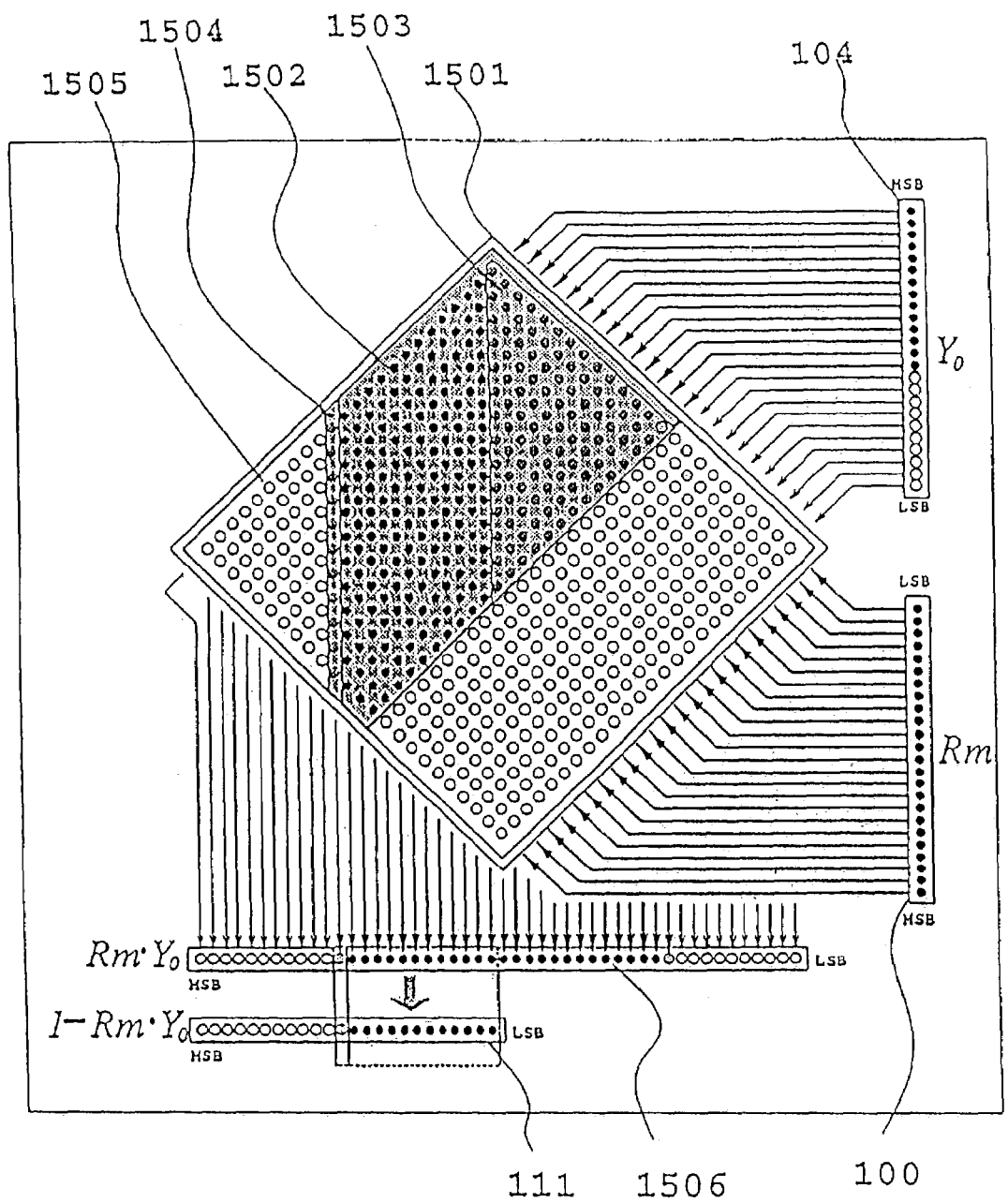
FIG. 15 is an illustrative view for showing a state in which an iteration calculation circuit of the N/R method is simplified.
Figure 16:
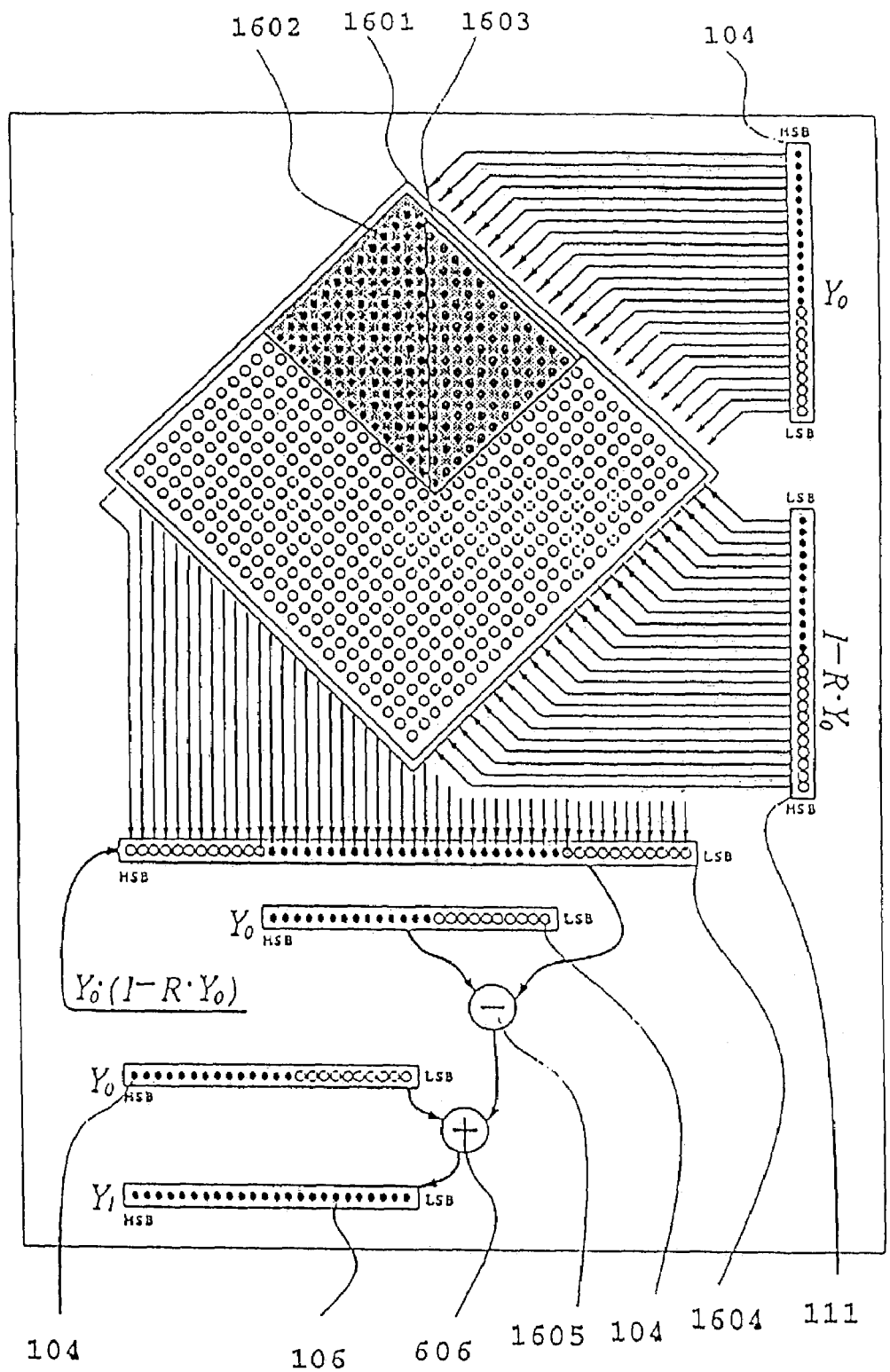
FIG. 16 is an illustrative view for showing a state in which an iteration calculation circuit of the N/R method is simplified.

In FIG. 15 or FIG. 16 is shown the preferred embodiment to which the present invention of claims 6 and 7 is applied in the case that the division of single precision is carried out. Since the initial value 104 has a precision of 12 bits, a guard bid of 2 bits for the operation is added and 14 bits are taken from the MSB and the remaining 10 bits at the LSB side are set to 0. With such an arrangement as above, it is satisfactory that the operation for 14 bits is carried out from the MSB side. This procedure is also applied to an intermediate result when the N/R method is repeated.

FIG. 15 indicates a partial product of 576 terms (a region 1501) in a multiplication operation in which the mantissa part 100 of the divisor is multiplied by the mantissa part of each of 24 bits of the initial value 104. As described above, if a position of a purposive bit is noted, it is satisfactory to consider only a partial product of a dark color section 1502 (including a light color region 1503).

If there occurs no problem in the case that a precision of calculation to be required is low, the section in the region 1503 may be eliminated in reference to the terms of corresponding degree from the LSB side. In this case, it is possible to keep at a certain degree a precision of calculation by adding a proper constant term in place of the eliminated terms.

The attained product 1506 is rounded, a complementary number of 2 is taken and a level of 1.0 is operated to calculate the value 111.

In addition, all the upper level bits of the value 111 become 1 without fail (when a relation of $Y0 \times R_m > 1.0$ is applied) or become 0 (when a relation of $Y0 \times R_m \leq 1.10$ is applied). Due to this fact, a calculation is performed up to the level corresponding to the partial product 1504 and if it is discriminated that the level is 0 or 1, the state of the upper level bit more than 1 can be acknowledged. With such an arrangement as above, it is possible to eliminate a calculation of the term of partial product in the region 1505 (white color).

Figure 6:
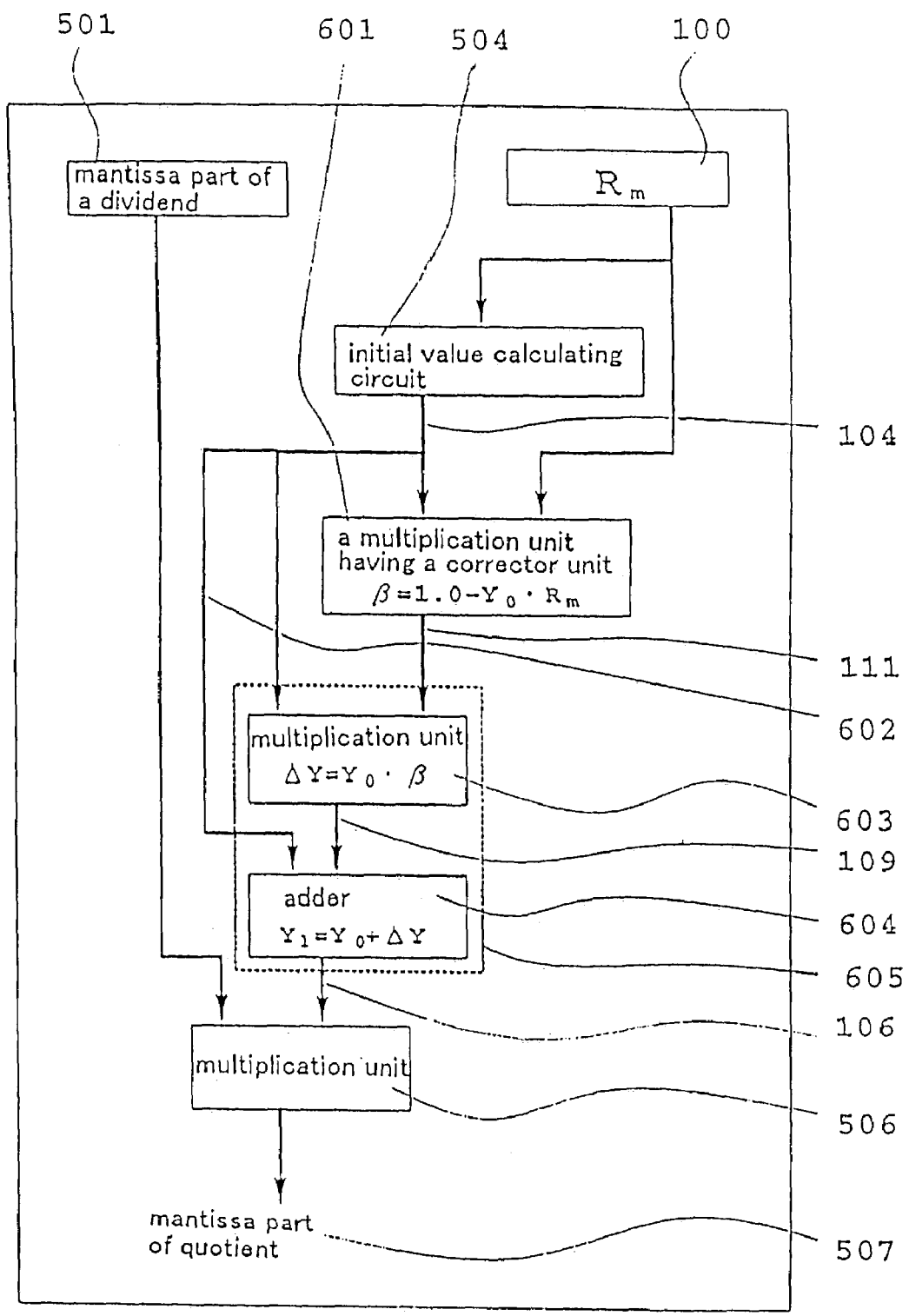
FIG. 6 is a circuit configuration view of one preferred embodiment of the present invention.
Figure 7:
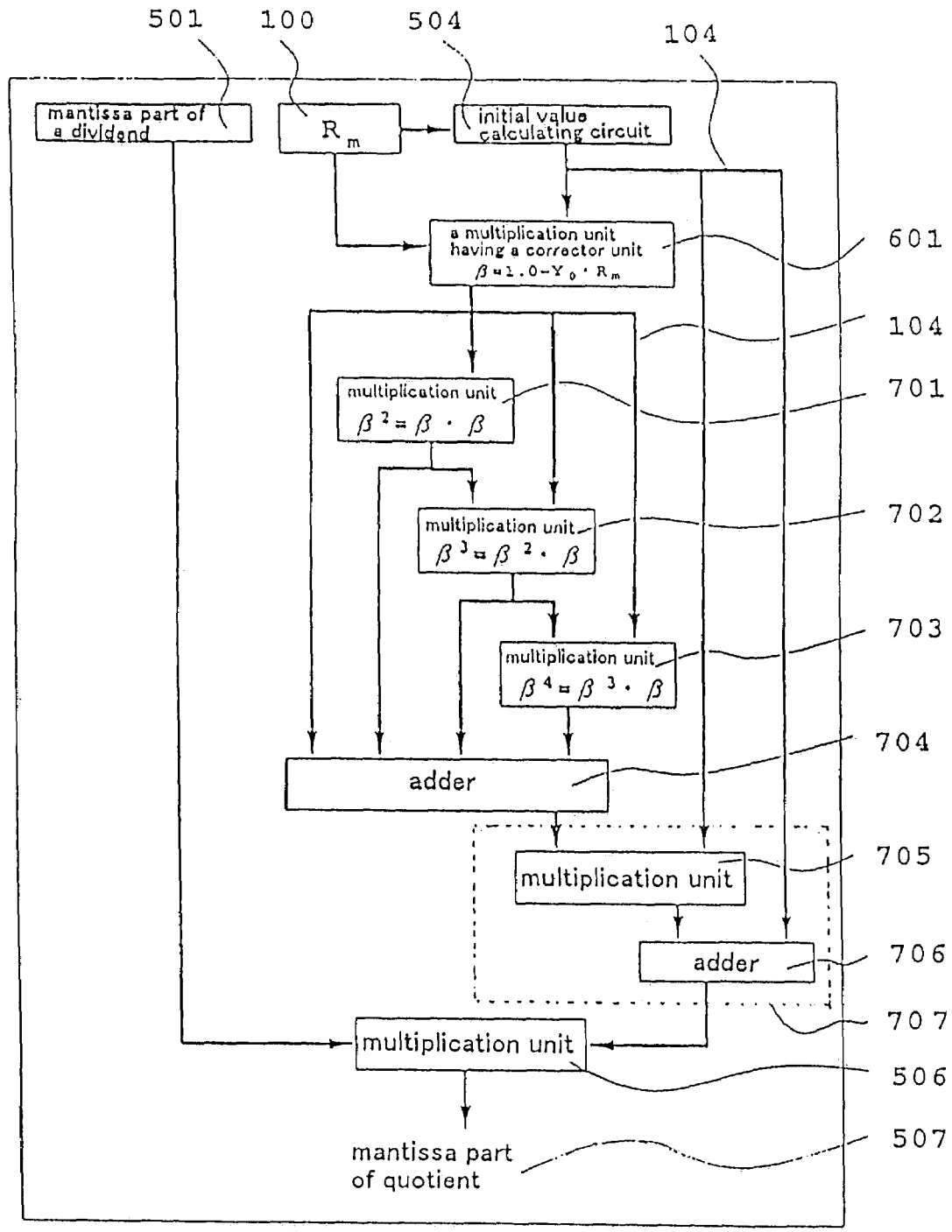
FIG. 7 is a circuit configuration view of one preferred embodiment of the present invention.
Figure 8:
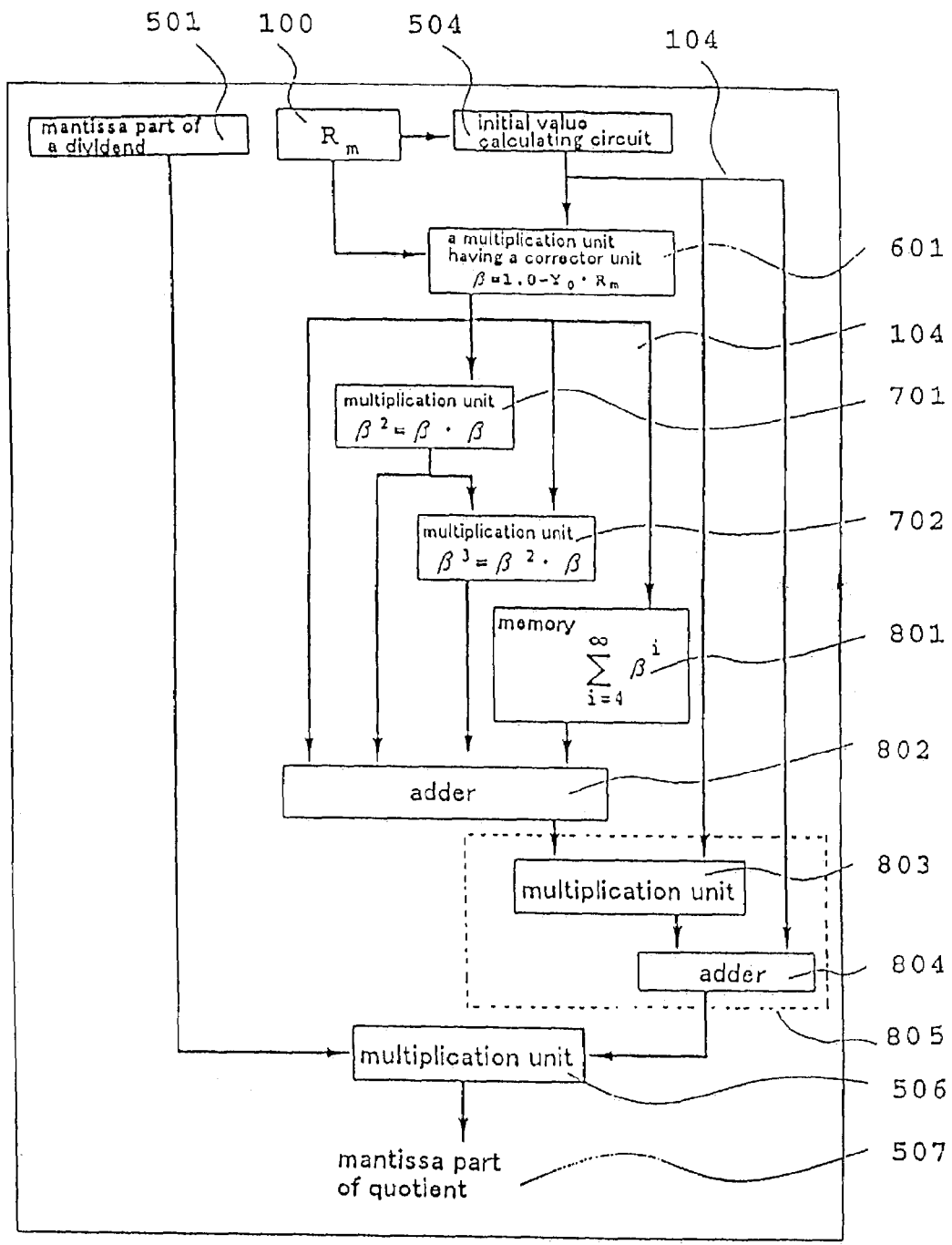
FIG. 8 is a circuit configuration view of one preferred embodiment of the present invention.
Figure 9:
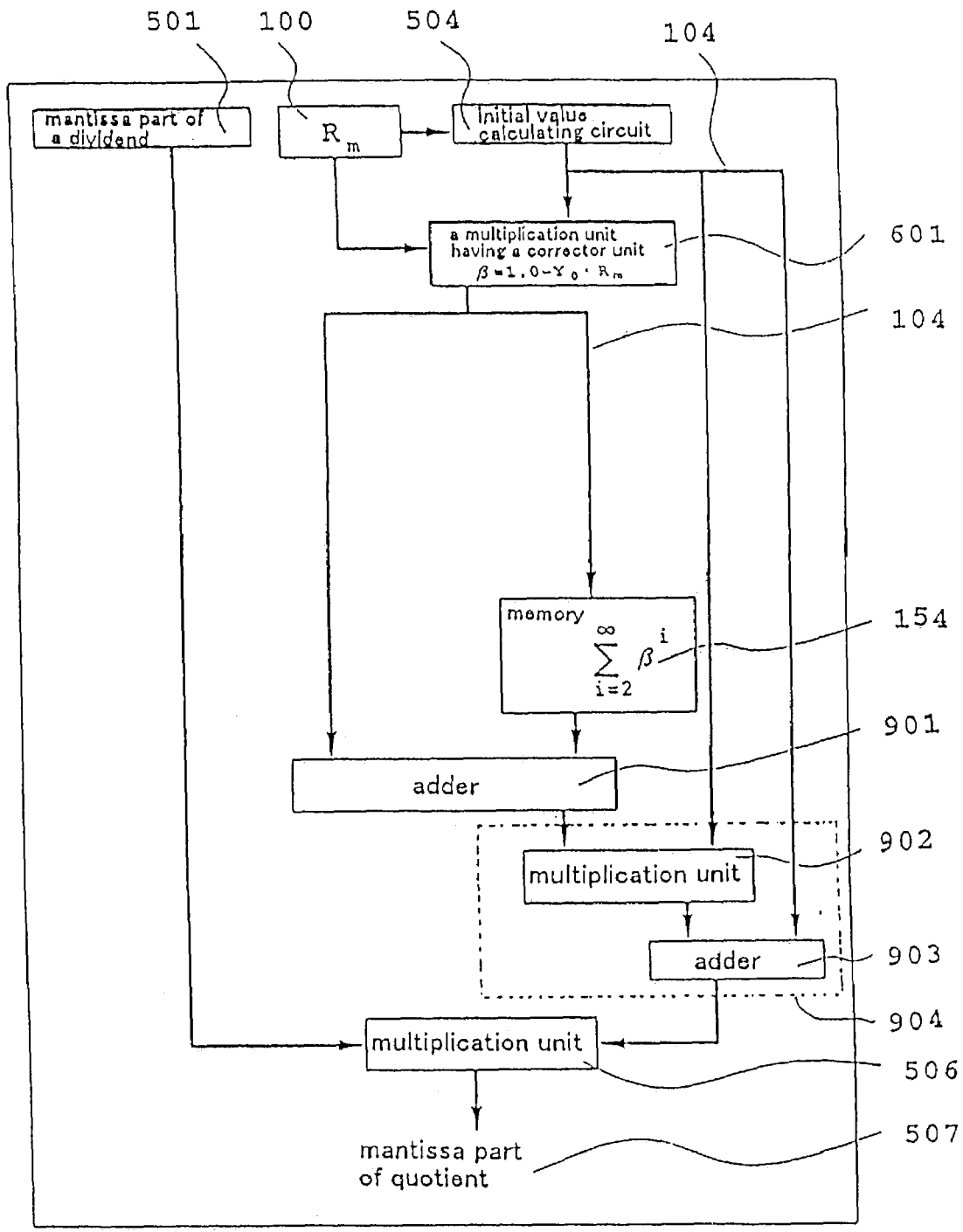
FIG. 9 is a circuit configuration view of one preferred embodiment of the present invention.
Figure 10:
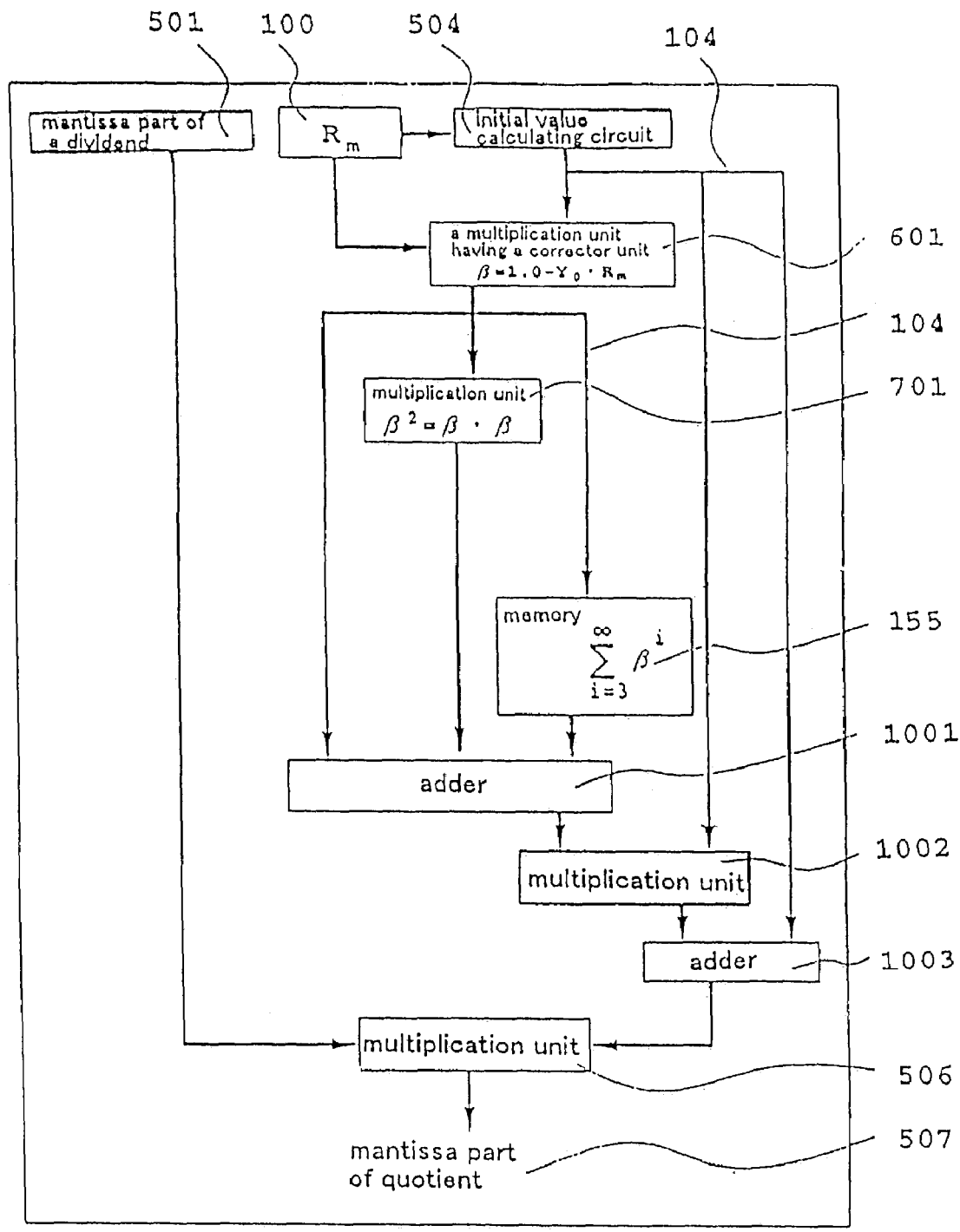
FIG. 10 is a circuit configuration view of one preferred embodiment of the present invention.
Figure 11:
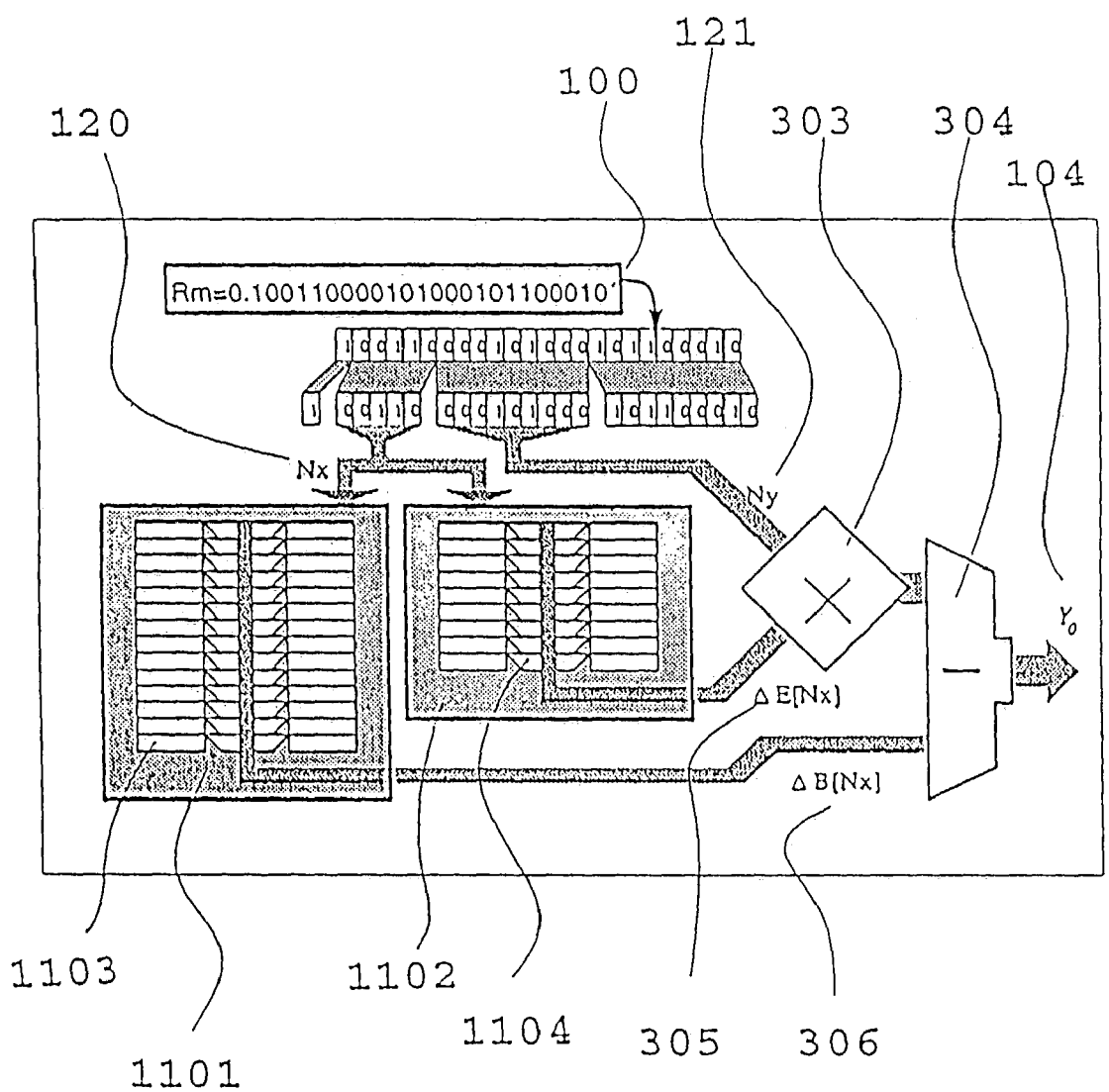
FIG. 11 is an illustrative view for showing a state in one preferred embodiment of the present invention in which a look-up table is used as a ROM and a table used in an initial value calculation circuit is stored in the memory.

Subsequently, a value 104 is further multiplied to it. Its state is shown in FIG. 16. This state corresponds to a block 605 in FIG. 6. Also in this case, it is satisfactory that a calculation about an invalid bit is eliminated and a calculation is carried out for the term of dark color part indicated in the region 1602. In addition, it is satisfactory that the adder 604 and the subtractor 1605 are treated as one term of the adder constituted in the multiplication and the block 605 may be constituted as one operation unit. It is determined whether or not the initial value 104 is subtracted from the product 1604 by the subtractor 1605 in response to the state of upper level bit of the value 111 (the level of the partial product 1504).

In addition, if it is satisfactory that the part of the light color region 1603 shows a low precision in calculation to be required, the term of corresponding degree may be eliminated from the LSB side. In this case, it is possible to keep at a certain degree a precision of calculation by adding a proper term of constant in place of the eliminated term.

As described above, a calculation of reciprocal number of single precision composed of a calculation of initial value and an iteration of the N/R method can be practically mounted. A circuit resource to be used is small as compared with the case in which two prior art multiplication units are added for performing an iteration calculation.

Figure 17:
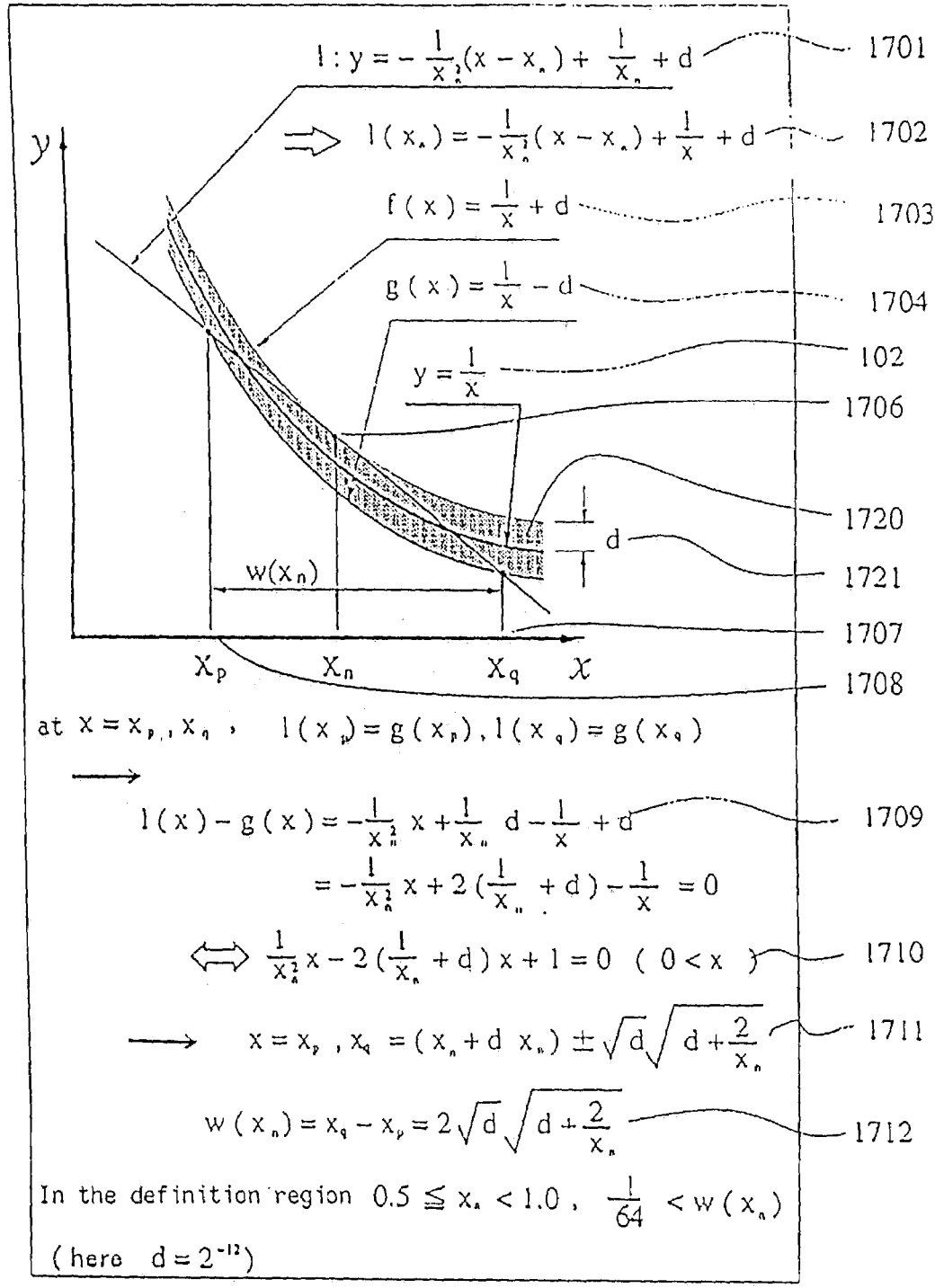
FIG. 17 is an analytical illustrative view for showing the number of sections in primary interpolation.

Referring to FIG. 17, the preferred embodiment about claim 15 will be described as follows. When there is present a curved line expressed by $$y = \frac{1}{x}$$

a curved line above an allowable error 1721 allowed to the initial value 104 is expressed as $$f(x) = \frac{1}{x} + d$$

and a curved line below it is expressed as $$g(x) = \frac{1}{x} - d$$

If there is an initial value within the colored region 1720 held by these two equations, a reciprocal number of predetermined precisions can be attained by the iteration calculation of the N/R method.

In the value 1706, $$y = -\frac{1}{x_n^2}(x - x_n) + \frac{1}{x_n} + d \left( \text{or } 1(x_n) = -\frac{1}{x_n^2}(x - x_n) + \frac{1}{x} + d \right)$$

expressing a line segment contacted with $f(x) =$ $\frac{1}{x} + d$ will be considered. In addition, a point crossing with $g(x) = \frac{1}{x} - d$ is applied as each of resolutions 1707, 1708.

In the resolution 1707 and the resolution 1708, under utilization of the fact that $$1(x_n) = -\frac{1}{x_n^2}(x - x_n) + \frac{1}{x} + d \text{ and } g(x) = \frac{1}{x} - d \text{ are equal to each other,}$$

$$1(x) - g(x) = -\frac{1}{x_n^2}x + \frac{1}{x_n}d - \frac{1}{x} + d = -\frac{1}{x_n^2}x + 2\left(\frac{1}{x_n} + d\right) - \frac{1}{x} = 0$$

is formulated and this resolution is calculated and then a distance between the resolution 1707 and the resolution 1708 is calculated. This equation has the same value as that of $$\frac{1}{x_n^2}x^2 - 2\left(\frac{1}{x_n} + d\right)x + 1 = 0 \text{ and its resolution is } x = x_p,$$

$$x_q = (x_n + dx_n^2) \pm x_n^2 \sqrt{d} \sqrt{d + \frac{2}{x_n}}$$

,so that a distance between the two resolutions is given by the value 1712.

A desired allowable error is replaced with the allowable error 1721 to cause the distance of the resolutions to be attained by the number 1712, thereby it becomes apparent to what segments the definition region ($0.5 \leq R_m < 1.0$) of the given divisor is divided.

In reference to $$\delta_{n+1} = -R_m \cdot \delta_n^2$$

it is apparent that a slight error is allowable in a range of $R_m < 1.0$ and so it is possible to decrease a precision of calculation within this range and to reduce the circuits.

Pertaining to this invention's claim 21, an example of execution is shown in FIG. 19. For multiplication units 1909 and 1904, from the bit array, multiplier 1.5 and multiplier 2.5 are shown. Because the only significant bit is the 2 bit, the multiplicand is properly shifted and inserted into the addition unit 2105.

APPLICABILITY IN INDUSTRY

Application of the inventions related to claim 1 and claim 3 enables a conflict in utilization of operation resources to be avoided, a flow of operation data to run completely in one direction, an entire circuit to become a pipe-line and then a throughput of operation to be improved. In addition, a construction of the exclusive circuit enables an operational procedure which is most preferable for the N/R method to be employed and it becomes possible to apply a procedure for saving a circuit resource or shortening an operation time.

Pertaining to this invention's claims 2 and 3 and its use, when the repetitive operation of the Newton-Raphson method is mounted in the circuit, part of the multiplication circuit is omitted, and the scale is made smaller. This leads to improved operation speed. At the same time, in the use of operation resources, collision may be evaded, and the flow of the operation data completely flows in one direction. All of the circuit becomes a pipeline, and the operation's "throughput" may be improved.

Pertaining to this invention's claims 4 to 7 and its use, the initial value expressed in the significant bit is reduced. In the operation circuit that uses this, especially the multiplication circuit, a part can be omitted. Accordingly, the scale is made smaller, and this leads to improved operation speed.

Pertaining to this invention's claims 8 and 9 and its use, the significant bit that expresses the value that appears during the repetitive calculation is reduced. In the operation circuit that uses this, especially the multiplication circuit, a part can be omitted. Accordingly, the scale is made smaller, and this leads to improved operation speed.

Pertaining to this invention's claim 10 and its use, from scarce circuit resources, efficient processing is possible with the reciprocal calculation and square root extraction's reciprocal calculation.

Application of the invention related to claim 11 enables a precision in operation to be improved by adding a multiplication unit, a circuit size to be reduced and at the same time an operation speed to be improved irrespective of the fact that the prior art N/R method requires an addition of the iteration time to improve a precision in operation and multiplication of twice must be performed in one time of iteration. In addition, application of the multiplication unit 705 enables the number of valid bits of the initial value 104 multiplied by series to be reduced and the number of circuits required in the multiplication unit 705 to be reduced. Additionally, a factorial calculator is added in addition to the multiplication unit, thereby it becomes possible to improve a precision in calculation without increasing a calculation time. In addition, it causes a value of term of higher level to be entered in the table and an application for easily improving a precision to be expanded.

Application of the invention related to claim 12 enables a precision in operation to be improved only by adding a multiplication unit, a circuit size to be reduced and at the same time an operation speed to be improved irrespective of the fact that the prior art N/R method requires an addition of the iteration time to improve a precision in operation and multiplication of twice must be performed in one time of iteration. In addition to the multiplication unit, a factorial calculator is added to enable a precision of operation to be improved without increasing an operation time. Additionally, application of the multiplication unit 803 causes the number of valid bits of the initial value 104 multiplied by the series to be reduced and also the number of circuits required in the multiplication unit 803 to be reduced. This effect may also be applicable in the multiplication units 902 and 1002.

Application of the invention related to claim 13 enables a part of series calculation, i.e. either a multiplication unit or a factorial calculator to be replaced with a memory storing the table, a size of the circuit to be reduced and further an operation speed to be improved. In particular, this is effective in the case that a precision of operation is to be improved by several bits while the calculation of series is being finished in the midway in its operation.

Application of the invention related to claim 14 enables a precision of operation to be improved more by several bits and a card bit to be produced irrespective of the fact that an initial value having a precision of 12 bits, for example, is provided and a reciprocal number of precision of 24 bits is attained.

Application of the invention related to claim 15 enables a reciprocal number of precision of 5.1 bits to be easily attained by applying a reciprocal number of precision of 17 bits to the initial value, for example, and at the same time adding of precision of operation by more than 2 bits under application of the table enables an operation of twice precision of IEEE 754 to be carried out. Or, applying a reciprocal number of precision of 18 bits to the initial value enables the reciprocal number of precision of 54 bits to be easily attained and at the same time adding of the precision of operation under application of the table enables a sufficient guard bit to be provided in an operation of multiple precision of IEEE 754.

Application of the invention related to claim 16 enables an initial value of precision of 12 bits, for example, to be given and easily expanded to a precision of 48 bits and further enables an operation of multiple precision of IEEE 754 to be carried out. Or, a reciprocal number is calculated in a multiple precision, this is multiplied by a dividend of simple precision and it becomes possible to apply a rounding in accordance with a rule of operation of simple precision of IEEE to the result of entire division.

Application of the invention related to claim 17, for example, applying a reciprocal number of precision of 18 bits to the initial value enables a reciprocal number of precision of 54 bits to be easily attained and further a sufficient reciprocal number to be produced in an operation of multiple precision of IEEE754.

Application of the invention related to claim 18 causes an initial value of precision of 12 bits, for example, to be given and a reciprocal number of precision of 48 bits to be produced and this is multiplied by a dividend of simple precision, resulting in that it becomes possible to apply a rounding in accordance with a standard of simple precision of IEEE in the entire division. Or, it becomes possible to apply an initial value of precision of 14 bits and to perform an operation of double precision (a precision of 53 bits) of IEEE754.

Pertaining to this invention's claim 19 and its use, in the usual N/R method, in order to improve the operation accuracy, the repetition frequency was increased, and with one repetition, there were two multiplication steps needed. Operation accuracy can be improved by only adding small scale multiplication units. By making the circuit scales smaller, the operation speed can be improved. By introducing a factorial calculation unit into the multiplication unit, operation accuracy can be improved without increasing calculation time. Also, using the multiplication unit 1906, the number of the significant bits of the initial value 402 to multiply in the series is lessened, and the number of necessary circuits for the multiplication unit 1906 is lessened.

Pertaining to this invention's claim 20 and its use, for example, the 12 bit accuracy of the initial value is provided, and the 48 bit reciprocal is produced. This is multiplied with the dividend, and through all of the division, the following of the IEEE standards becomes possible. In other words, a doubled operation accuracy of IEEE 754 (53 bit accuracy)is possible when the 14 bit accuracy of the initial value is provided.

Pertaining to this invention's claim 21 and its use, part of the series calculation, that is, the multiplication unit and factorial calculation unit's table memory storage can be replaced. By making the circuit scales smaller, the operation speed can be improved. Especially, by discontinuing the series calculation in the middle, the accuracy of the number bit calculation can be improved in some cases.

Pertaining to this invention's claim 22 and its use, the reciprocal calculation and square root extraction's reciprocal calculation share circuit resources. Because of the small amount of circuit resources, two operation functions can be realized.

Applying the invention related to claim 23 enables a minimum requisite size of table, i.e. a memory capacity to be calculated and a circuit of minimum size to be designed while a required specification of the precision of operation is being satisfied.

Applying the invention related to claim 24 enables a table used in a calculation of initial value to be stored in a look-up table and further either a reciprocal number operating circuit or a division circuit to be practically mounted on the PLD having a high restriction in a circuit resource.

Applying the invention related to claim 25 enables a table of values of series to be stored in a look-up table and then a precision in operation to be easily improved even on the PLD having a high restriction on a circuit resource.

Applying the invention related to claim 26 enables a multiplication to be carried out continuously or an operation speed of the circuit of the present invention where both a multiplication and an adding or subtraction are alternatively carried out to be improved.

What is claimed is:

1. An operation system, wherein from the divisor in a division operation, the approximate value of a reciprocal of the divisor is acquired; the value is used as an initial value to carry out an iteration calculation of the Newton-Raphson method more than once to obtain the reciprocal of requisite accuracy; and the reciprocal is multiplied by a dividend for the division operation, characterized in that:

the system is provided with a circuit dedicated for the iteration calculation of the Newton-Raphson method and the initial value in the calculation is rounded to a value of minimum accuracy necessary for the calculation to make subordinate bits of the rounded value zero, so that a part of a multiplication circuit used for the iteration calculation is abbreviated; and a formula of the iteration calculation of the Newton-Raphson method is modified to separate a difference and partial products related to bits in which 0 or 1 is continued from the most significant bit (MSB) of the difference are eliminated in the multiplication circuit under utilization of the fact that an absolute value of the difference is small.

2. The operation system according to claim 1 characterized in that a formula of the iteration calculation of the Newton-Raphson method is modified to separate a difference and a part of the multiplication circuit used for the iteration calculation is eliminated under utilization of the fact that less amount of information is required for the operation of this difference.

3. An operation system, wherein depending on the argument of a square root extraction calculation, the approximate value of the square root extraction's reciprocal is acquired; the value is used as an initial value to carry out an iteration calculation of the Newton-Raphson method more than once to obtain the square root extraction's reciprocal of appropriate accuracy; and the reciprocal is multiplied by the argument for the square root extraction calculation, characterized in that:

the system is provided with a circuit dedicated for the iteration calculation of the Newton-Raphson method and the initial value in the calculation is rounded to a value of minimum accuracy necessary for the calculation to make subordinate bits of the rounded value zero, so that a part of the multiplication circuit used for the iteration calculation is abbreviated; and that a formula of the iteration calculation of the Newton-Raphson method is modified to separate a difference and partial products related to the bits in which 0 or 1 is continued from a most significant bit (MSB) of the difference are eliminated in the multiplication circuit under utilization of the fact that an absolute value of the difference is small.

4. The operation system according to claim 1, characterized in that: in the calculation of the square root extraction's reciprocal in the Newton-Raphson method, the divisor is $R_m$, the true reciprocal value is, $Y\infty$, and the initial value is $Y_0$; these values correspond to the iteration calculation in the Newton-Raphson method; also when the argument, $R'_m$, of the square root extraction calculation, the true square root extraction's reciprocal value, $Y'\infty$, and the initial value, $Y'_0$, correspond to the iteration calculation in the Newton-Raphson method (the reciprocal calculation of this claim is described below, but in the square root extraction's reciprocal calculation, the changes, $Y\infty$ is $Y'\infty$ and $Y_0$ is $Y'_0$, are applied), the initial value of the Newton-Raphson method is $Y\infty-\delta_-\leq Y_0\leq Y\infty+\delta_+$; when this is required, the larger absolute value $\delta_+$ is between $\delta_-$ (where $\delta_-\geq 0$) and $\delta_+$ (where $\delta_+\geq 0$); the range is $Y\infty-\delta_{a-}\leq Y_0\leq Y\infty+\delta_a$ and the initial value, $Y_O$, can be expressed as a specific or subordinate bit in a bit vector; and all of the bits can be rounded to 0 for the calculation in the Newton-Raphson method and using the iteration calculation, part of the multiplication operation can be abbreviated.

5. The operation system according to claim 1, characterized in that: the initial value of the Newton-Raphson method is $Y\infty-\delta_-\leq Y_0\leq Y\infty+\delta_+$; when the initial value, $Y_0$, is introduced, the larger absolute value, $\delta_a$, is between $\delta_-$ (where $\delta_-\geq 0$) and $\delta_+$ (where $\delta_+\geq 0$); the condition, $Y_0+2^m\leq Y\infty+\delta_a$, is fulfilled with the maximum integer, m; if it is less than the value of $2^{(m-1)}$, then it is rounded up to $2^m$, and the operation of the Newton-Raphson method take places with the value of $2^{(m-1)}$ and all of the subordinate bits rounded to 0, making the new initial value, $Y_0$; and using the iteration calculation, part of the multiplication operation can be abbreviated.

6. The operation system according to claim 1, characterized in that: the initial value of the Newton-Raphson method is $Y\infty-\delta_-\leq Y_0\leq Y\infty+\delta_+$; when the initial value, $Y_0$, is introduced, the larger absolute value, $\delta_a$, is between $\delta_-$ (where $\delta_-\geq 0$) and $\delta_+$ (where $\delta_+\geq 0$); the condition, $Y\infty-\delta_a\leq Y_0-2^m$, is fulfilled with the maximum integer, m; if it is less than the value of $2^{(m-1)}$, then it is rounded down to $2^{(m-1)}$, and the operation of the Newton-Raphson method take places with the value of $2^{(m-1)}$ and all of the subordinate bits rounded to 0, making the new initial value, $Y_0$; and using the iteration calculation, part of the multiplication operation can be abbreviated.

7. The operation system according to claim 1, characterized in that: the initial value of the Newton-Raphson method is $Y\infty-\delta_-\leq Y_0\leq Y\infty+\delta_+$; when the initial value, $Y_0$, is introduced, the larger absolute value, $\delta_a$, is between $\delta_-$ (where $\delta_-\geq 0$) and $\delta_+$ (where $\delta_+\geq 0$); the condition, $Y\infty-\delta_a\leq Y_0+2^m\leq Y\infty+\delta_a$, is fulfilled With the maximum integer, m; depending on the value of $2^{(m-1)}$, 0 is replaced by 1, and the operation of the Newton-Raphson method take places with the value of $2^{(m-1)}$ and all of the subordinate bits rounded to 0, making the new initial value, $Y_0$; and using the iteration calculation, part of the multiplication operation can be abbreviated.

8. The operation system according to claim 1, characterized in that: the initial value of the reciprocal calculation of the Newton-Raphson method is $Y\infty-\delta_-\leq Y_0\leq Y\infty+\delta_+$; when the initial value, $Y_0$, is introduced, the larger absolute value, $\delta_a$, is between $\delta_-$ (where $\delta_-\geq 0$) and $\delta_+$ (where $\delta_+\geq 0$); the minimum integer, n; is $2^n\geq\delta_a$; the multiplication, $R_m' \cdot Y_0$, appears in the iteration calculation of the Newton-Raphson method (or using the complement 2 in the operation $\beta=1-R_m\cdot Y_0$ with a value of 1.0); including the value of $2^{(n+2)}$, higher bits are all omitted, and including the value of $2^{(n+1)}$, only the subordinate bits are used in the operation; and the value of $2^n$ is handled as a sign bit value.

9. The operation system according to claim 3, characterized in that: the initial value of the square root extraction's reciprocal calculation of the Newton-Raphson method is $Y'\infty-\delta_-\leq Y'_0\leq Y'\infty+\delta_+$; when the initial value, $Y_0$, is introduced, the larger absolute value, $\delta_a$, is between $\delta_-$ (where $\delta_-\geq 0$) and $\delta_+$ (where $\delta_+\geq 0$); the minimum integer, p, is $2^p\geq(\delta_a+\delta_a^2/2)$; the multiplication, $R'_m\cdot(Y'_0^2)$, appears in the iteration calculation of the Newton-Raphson method (or using the complement 2 in the operation $2\beta'=(1-R'_m\cdot(Y'_0^2)$ with a value of 1.0); including the value of $2^{(p+3)}$, higher bits are all omitted, and including the value of $2^{(p+2)}$, only the subordinate bits are used in the operation; and the value of $2^{(p+2)}$ is handled as a sign bit value.

10. The operation system according to claim 3, characterized in that: in the reciprocal calculation, iteration calculation, and square root extraction's reciprocal calculation of the Newton-Raphson method, the multiplication, $R_m\cdot Y_0$, and multiplication $R'_m\cdot Y'_0{}^2$, are processed by the same multiplication circuit; at the same time, the multiplication of $Y_0\cdot\beta$, $Y'_0$, and $\beta'$ are processed by the same multiplication circuit; and the reciprocal calculation and square root extraction's reciprocal calculation share the same calculation circuit.

11. The operation system according to any one of claims 1, 2 and 4 to 10 is characterized in that: a calculation of series is carried out in a limitless number of times for a product of an initial value and a divisor on the basis of a value subtracted from 1.0 and a precision in operation of a reciprocal number is improved by multiplying it by the initial value.

12. The operation system according to any one of claims 1, 2 and 4 to 10 is characterized in that: a calculation of series of definite terms is carried out in a limitless number of times for a product of an initial value and a divisor on the basis of a value subtracted from 1.0 and a precision in operation of a reciprocal number is improved by multiplying it by the initial value.

13. The operation system according to claim 11 characterized in that: a value of calculation of series is stored in a memory as a table, a value retrieved from the table with the content of a bit field extracted from a bit-string expressing a value subtracting a product of an initial value and a divisor from 1.0 being applied as an index is replaced with a part of the calculation of series.

14. The operation system according to claim 11 in which a value of $$\sum_{i=2}^{\infty} \beta^i$$

is stored in a memory as a table, and a value retrieved from the table with a content of the bit field extracted from a bit-string expressing a value of a product of an initial value and a divisor subtracted from 1.0 being applied as an index is used to perform a calculation indicated in $$Y_\infty = Y_0 \cdot \left(1 + \beta + \sum_{i=2}^{\infty} B^i\right).$$

15. The operation system according to claim 11 in which a value of $$\sum_{i=3}^{\infty} \beta^i$$

is stored in a memory as a table, and a value retrieved from the table with a content of the bit field extracted from a bit-string expressing a value of a product of an initial value and a divisor subtracted from 1.0 being applied as an index is used to perform a calculation indicated in $$Y_\infty = Y_0 \cdot \left(1 + \beta + \beta^2 + \sum_{i=3}^{\infty} B^i\right).$$

16. The operation system according to claim 11 in which a value of $$\sum_{i=4}^{\infty} \beta^i$$

is stored in a memory as a table, and a value retrieved from the table with a content of the bit field extracted from a bit-string expressing a value of a product of an initial value and a divisor subtracted from 1.0 being applied as an index is used to perform a calculation indicated in $$Y_\infty = Y_0 \cdot \left(1 + \beta + \beta^2 + \beta^3 + \sum_{i=4}^{\infty} B^i\right).$$

17. The operation system according to claim 12 in which a calculation indicated in $$Y = Y_0 \cdot (1 + \beta + \beta^2)$$

is carried out.

18. The operation system according to claim 12 in which a calculation indicated in $$Y = Y_0 \cdot (1 + \beta + \beta^2 + \beta^3)$$

is carried out.

19. The operation system according to claim 3, characterized in that: for the square root extraction calculation, a calculation indicated in $$\beta' = \frac{1}{2}(1 - Y_0'^2 \cdot R'm)$$

whereas for $R'_m$, the argument's mantissa, also $Y'_0$ the approximate value of the square foot extraction's reciprocal, $R'_m$, of the initial value of the iteration operation in the Newton-Raphson method, is carried out, and then a calculation indicated in $$Y'_\infty = Y'_0 \cdot \left(1 + \beta' + \beta'^2 + \sum_{i=3}^{\infty} N_i \cdot B'^i\right)$$

is carried out, where the continuity is shown by all of the series in the calculation, and also the calculation to the n-th item; so that calculation accuracy is improved.

20. The operation system according to claim 3, characterized in that: for the square root extraction calculation, a calculation indicated in $$\beta' = \frac{1}{2}(1 - Y_0'^2 \cdot R'm)$$

whereas for $R'_m$, the argument's mantissa, also $Y'_0$ the approximate value of the square root extraction's reciprocal, $R'_m$, of the initial value of the iteration operation in the Newton-Raphson method, is carried out, and then a calculation indicated in $$Y_2 = Y_0 \cdot (1 + \beta' + \beta'^2 + 1.5\beta'^3 2.5\beta'^4 + \beta'^5)$$

is carried out.

21. The operation system according to claim 3, characterized in that: for the square root extraction calculation, a value of $$1.5\beta'^3 + 2.5\beta'^4 + \beta'^5$$

whereas for $R'_m$, the argument's mantissa, also $Y'_0$ the approximate value of the square root extraction's reciprocal, $R'_m$, of the initial value of the iteration operation in the Newton-Raphson method method, is stored in memory as a table, the bit field's contents that are extracted from the bit array that expresses β' are indexed and used in a table to calculate $$Y_2 = Y_0 \cdot (1 + \beta' + \beta'^2 + 1.5\beta'^3 + 2.5\beta'^4 + \beta'^5);$$

so that calculation accuracy is improved.

22. The operation system according to claim 11, characterized in that: the series calculation expressed in the β value in the reciprocal calculation and the series calculation expressed by β' in the square root extraction's reciprocal calculation, are shared.

23. The operation system according to any one of claims 1 to 10 and 13–18, characterized in that: when the reciprocal calculation takes place, the divisor's mantissa is expressed by the bit array which excludes the 1 bit MSB and is divided into three bit fields; from there, the contents of the MSB bit field are used as an index and, as two values, taken from the memory; these values and their related bit field contents are used in the first approximation when the initial value is calculated; the divisor's mantissa is formalized as Rm=0.5≦Rm≦1.0; through w ($x_n$) expressed by $$w(x_n) = 2 \times \frac{2}{n} \sqrt{d} \sqrt{d + \frac{2}{x_n}}$$

where where d is the initial value and the acceptable range of error is $x_n$=0.5≦$x_n$≦1.0, $S_0$ crosses the definition range of $R_m$, that is, $S_0$=0.5/w ($x_n$); next $S_0$≦$2^K$ is fulfilled by the minimum integer, K; the definition range, $R_m$, is divided evenly, $2^K$, and an initial value is acquired in each divided part in the first approximation.

24. The operation system according to any one of claims 1 to 10 and 13–22 characterized in that it is practically mounted in a look-up table type programmable logic device, the look-up table is used as a small-sized ROM memory, a table used for a calculation of an initial value is stored in the memory and practically mounted.

25. The operation system according to any one of claims 13 to 16 characterized in that it is practically mounted in a look-up table type programmable logic device, the look-up table is used as a small-sized memory, and a table of value of a part of calculation of series is stored in the memory.

26. The operation system according to any one of claims 4 to 10 and 13 to 18 in which a calculation time is shortened by applying an operation circuit for redundancy expression in a combination of consecutive adding and multiplication in a calculation of initial value, an iteration calculation and a calculation using a value in which a product of an initial value and a divisor is subtracted from 1.0.

* * * * *